United States Patent
Horiguchi et al.

(10) Patent No.: US 7,153,605 B2
(45) Date of Patent: Dec. 26, 2006

(54) FUEL CELL COOLED BY LATENT HEAT OF WATER EVAPORATION

(75) Inventors: Munehisa Horiguchi, Tokyo (JP); Hidemi Kato, Tokyo (JP); Masataka Ueno, Tokyo (JP)

(73) Assignee: Kabushikikaisha Equos Research, Tokyo (JP)

( * ) Notice: Subject to any disclaimer, the term of this patent is extended or adjusted under 35 U.S.C. 154(b) by 414 days.

(21) Appl. No.: 10/214,395

(22) Filed: Aug. 8, 2002

(65) Prior Publication Data

US 2003/0039875 A1  Feb. 27, 2003

(30) Foreign Application Priority Data

| Aug. 21, 2001 | (JP) | 2001-250861 |
| Oct. 18, 2001 | (JP) | 2001-321180 |
| Feb. 28, 2002 | (JP) | 2002-054839 |

(51) Int. Cl.
- H01M 2/14 (2006.01)
- H01M 2/00 (2006.01)
- H01M 8/04 (2006.01)
- H01M 8/02 (2006.01)
- H01M 8/24 (2006.01)

(52) U.S. Cl. ............ 429/38; 429/26; 429/34

(58) Field of Classification Search ......... 429/17, 429/26, 30, 31, 34, 35, 38, 39; 702/60, 65; 264/29.5; 204/292, 227; 313/35; 60/39.182; 156/270, 498; 423/488; 96/325; 110/346; 166/267; 122/32; 216/93; 422/188
See application file for complete search history.

(56) References Cited

U.S. PATENT DOCUMENTS

| 4,678,724 A | * | 7/1987 | McElroy | 429/34 |
| 5,776,624 A | * | 7/1998 | Neutzler | 429/26 |
| 5,998,054 A | * | 12/1999 | Jones et al. | 429/34 |
| 6,045,934 A | | 4/2000 | Enami | 429/30 |
| 2002/0142201 A1 | * | 10/2002 | Nelson | 429/26 |
| 2003/0170523 A1 | * | 9/2003 | Miyano et al. | 429/34 |

FOREIGN PATENT DOCUMENTS

| JP | 06-338338 | 12/1994 |
| JP | 10-247505 | 9/1998 |

* cited by examiner

Primary Examiner—Patrick Joseph Ryan
Assistant Examiner—Robert Hodge
(74) Attorney, Agent, or Firm—Bacon & Thomas, PLLC

(57) ABSTRACT

A fuel cell wherein efficient cooling is achieved by supplying air and cooling water simultaneously while maintaining cooling and wetting of a membrane without increasing the size of the fuel cell. The fuel cell includes a separator sandwiched between unit cells. The separator includes an air passage on a front surface side abutting at least on a cathode of the unit cell and cooling passages supplied with air and water on the rear side thereof to cool the unit cell with latent heat of evaporation of water by heat of the unit cell transmitted to the cooling space. Thereby, the unit cell is cooled via the separator and clogging of the air passages by water is prevented.

13 Claims, 21 Drawing Sheets

F I G. 2 3
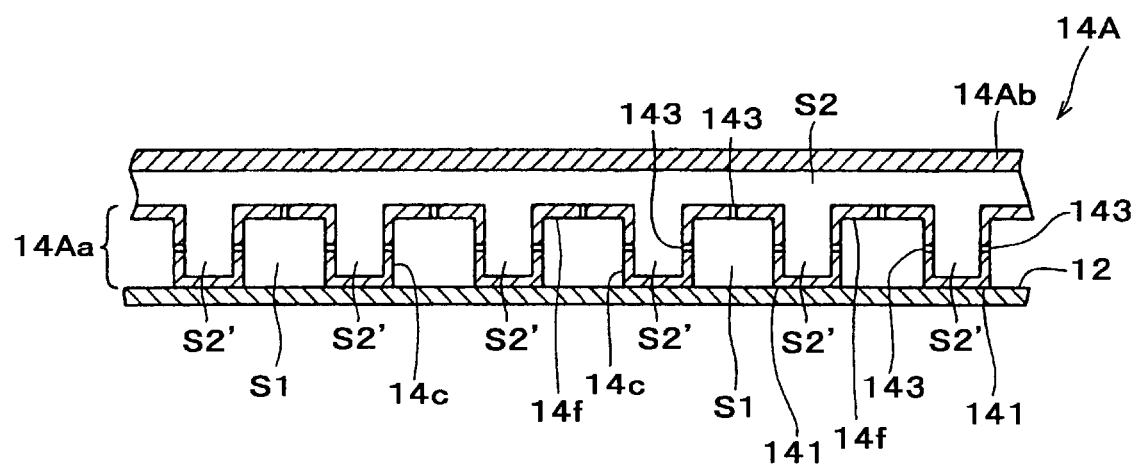

FUEL CELL COOLED BY LATENT HEAT OF WATER EVAPORATION

BACKGROUND OF THE INVENTION

1. Field of the Invention

The present invention relates to a fuel cell, particularly to cooling of the fuel cell using a separator interposed between unit cells.

2. Description of Related Art

A unit cell of a PEM-type fuel cell is composed of an anode (referred to as a hydrogen electrode since hydrogen gas is generally used as a fuel), an oxidant electrode (hereinafter referred to as a cathode since air including oxygen is similarly used as oxidant), and a solid polymer electrolyte membrane interposed therebetween. Both anode and cathode are composed of catalyst layers, which include catalytic substances, and electrode substrates, which function to support the catalyst layers and to transmit reaction gas and further function as current collectors. Further, on the outside surface of each of the anode and the cathode, is a separator (connector plate) which uniformly supplies an electrode surface with hydrogen or air as reaction gas supplied from the outside of the cell and which is provided with a gas passage (generally structured as a groove with an electrode surface side open) for discharging excess reaction gas from the cell. This separator prevents gas transmission and collects current for supply to the outside. The above-described unit cell and the separator compose one unit of an electric cell.

In an actual fuel cell, a plurality of the unit cells are assembled in series into a stack. In such a fuel cell, it is necessary to keep the solid polymer electrolyte membrane in the unit cell in a fully moist state in order to maintain sufficient power generation efficiency. Generally, the water generated by the electrolytic reaction is insufficient so that a means for supplying humidification water to each unit cell is required. In addition, a substantially proportional quantity of heat to generated power is generated by the electrolytic reaction, so that a cooling means for preventing the fuel cell itself from being overly heated is required.

As a cooling means for the fuel cell, various means have been proposed which also wet the solid polymer electrolyte membrane. For example, in Japanese Patent Laid-open No. Hei 10-247505, air to which water has been previously added is supplied and the water is evaporated within a cooling gas passage for cooling, with circulation of the air that includes the evaporated moisture.

Japanese Patent Laid-open No. Hei 6-338338 shows a hollow portion, separate from the gas passage formed in the separator. Cooling water passed through the hollow portion supplies the air passage with vapor through a porous wall surface.

According to the prior art, it is difficult to maintain both cooling and wetting of the membrane. For example, according to Japanese Patent Laid-open No. Hei 10-247505, with recirculation of the air that includes vapor generated by evaporating liquid water in the cooling gas passage, it is difficult to maintain the temperature of the cooling gas passage in the circulation path. For example, when temperature increases in the air passage after the temperature decreases in the circulation path, the moisture is removed from the electrolyte membrane into the air passage, which makes it difficult to maintain wetting of the membrane.

In Japanese Patent Laid-open No. Hei 6-338338, though the vapor is supplied through a porous wall surface, the supplied vapor is not necessarily sufficient and, in the cooling water passage, cooling is only by sensible heat so that enormous mechanical equipment and energy for circulating the cooling water may be required for complete cooling.

SUMMARY OF THE INVENTION

Therefore, an object of the present invention is to maintain both cooling and wetting of a membrane. Further, the present invention provides a fuel cell that enables more efficient cooling without enlarging the fuel cell.

The above-described object is achieved by providing a fuel cell including a plurality of unit cells each including an anode and a cathode and a plurality of separators, each arranged between the unit cells, wherein the separator comprises an air passage on a front face side in contact with the cathode of the unit cell and a cooling passage supplied with air and water on a back face side thereof, the air passage and the cooling passage communicate through a through-hole passing through the separator so as to cool the unit cells by latent heat of evaporation of water in the cooling space and to supply the air passage with vapor through the through-hole.

It is advantageous to include the cooling space (passage) within the separator and arranged adjacent to the air passage.

In the above-described structure, it is also advantageous to fabricate the separator of a pressed plate material, wherein a space between raised portions protruding from a plate surface serves as the air passage, and a space on a back side of the raised portions serves as the cooling passage.

It is further advantageous to have the wall surface surrounding the cooling passage of the separator be hydrophilic on at least on a portion thereof.

In the above-described structure the air passage may have one end closed, while communication with the cooling passage is maintained through the through-holes spaced along the way from the closed end to the open end.

A smaller amount of liquid water is supplied to the air passage than to the cooling passage.

A cooling passage on an inlet side is connected to a manifold supplying air and water, while an outlet side serves as an open passage.

Preferably, the separator is made of metal with high corrosion resistance.

More preferably, the separator is made of stainless steel.

In another aspect, the present invention provides a fuel cell including a plurality of unit cells each including an anode and a cathode and a plurality of separators each arranged between adjacent unit cells, wherein the separator comprises an air passage on a front face side, contacting at least a cathode of the unit cell, and a cooling passage on a back face thereof, and air and water are supplied to the air passage and the cooling passage to cool the unit cell by latent heat generated when the supplied water evaporates.

Preferably, the air passage and the inlet of the cooling passage are connected to the same manifold and are supplied with air and water from the manifold.

Preferably, the separator is formed of a plurality of plates which at least partially abut each other, while the cooling passage is an opening between the abutting portions.

Heat generated by the electrolytic reaction is transmitted from the unit cell to the separator and it evaporates water in the cooling passage to cool the separator with its latent heat, which results in cooling the unit cell via the separator. In this manner, the unit cell can be cooled without supplying the air passage with water droplets. In addition, vapor generated by evaporation in the cooling passage passes through the through-holes to the air passage and is then supplied to and absorbed by the unit cell abutting the air passage, which results in adding water to the unit cell.

Latent heat of evaporation of water, evaporated in the cooling passage, also cools the air passage adjacent the cooling passage, so that fluid flowing through the air passage is cooled and this cooling effect indirectly operates to cool the unit cell. This results in a cooling effect not only where the unit cell abuts the cooling passage but also where it abuts the air passage, and thus the unit cell is uniformly cooled.

The wall surrounding the cooling passage and the wall separating the air passage and the cooling passage are both made thin, so that latent heat cooling caused by water evaporation in the cooling passage effectively cools the unit cell.

Water droplets easily adhere to the wall of the separator surrounding the cooling passage, so that direct heat transmission from the wall to the droplets occurs over a wide surface, which further facilitates water evaporation in the cooling passage.

Alternatively water is supplied to the air passage only in a vapor state. Thereby, air supply to the air passage is smooth without interference by droplets. The same is true when only a small amount of liquid water enters the air passage.

When employing a common manifold, air and water can be continuously supplied to the cooling passage and the heated air and water can be continuously discharged therefrom, so that cooling effect is further improved.

The cooling passages are formed between metal plates where the metal plates alternately abut each other, without any wasted space.

BRIEF DESCRIPTION OF THE DRAWINGS

FIG. 23 is a partial horizontal sectional view of a fuel cell separator in yet another modification of the third embodiment.

DETAILED DESCRIPTION OF THE PREFERRED EMBODIMENTS

Figure 1:
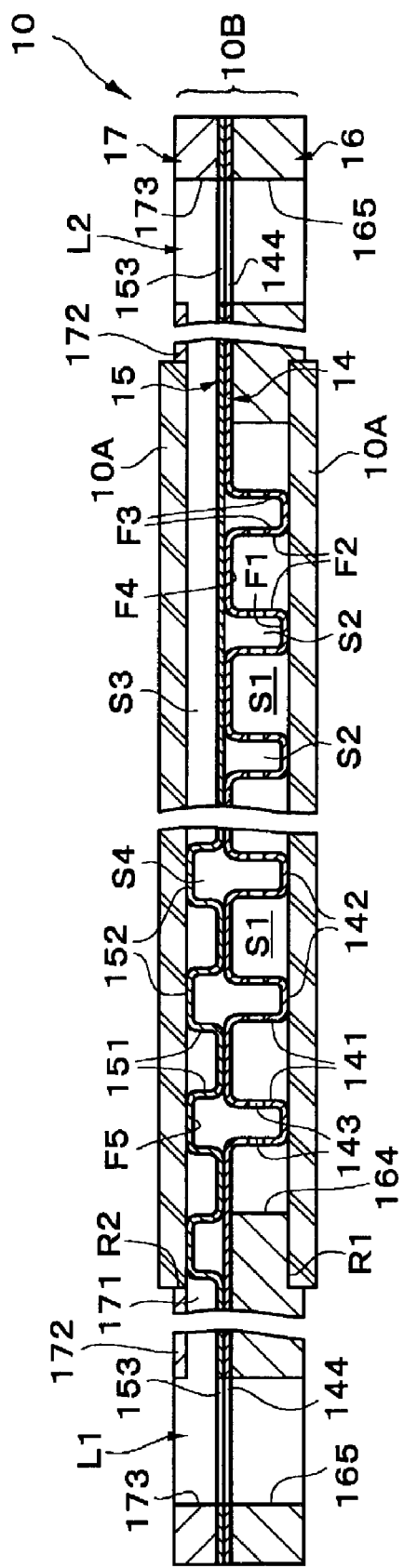
FIG. 1 is a partial horizontal sectional view of a separator and two unit cells of a fuel cell according to a first embodiment of the present invention.

Hereinafter, embodiments of the present invention will be explained with reference to the drawings. First, FIG. 1 to FIG. 6 show a first embodiment of the present invention. FIG. 1 is a cross sectional view of an electric cell 10 which is one unit of a fuel cell stack. As shown in FIG. 1, this electric cell has a separator 10B, comprising current collectors 14, 15 and frame members 16, 17, which is arranged between the unit cells 10A adjacent to each other.

Figure 2:
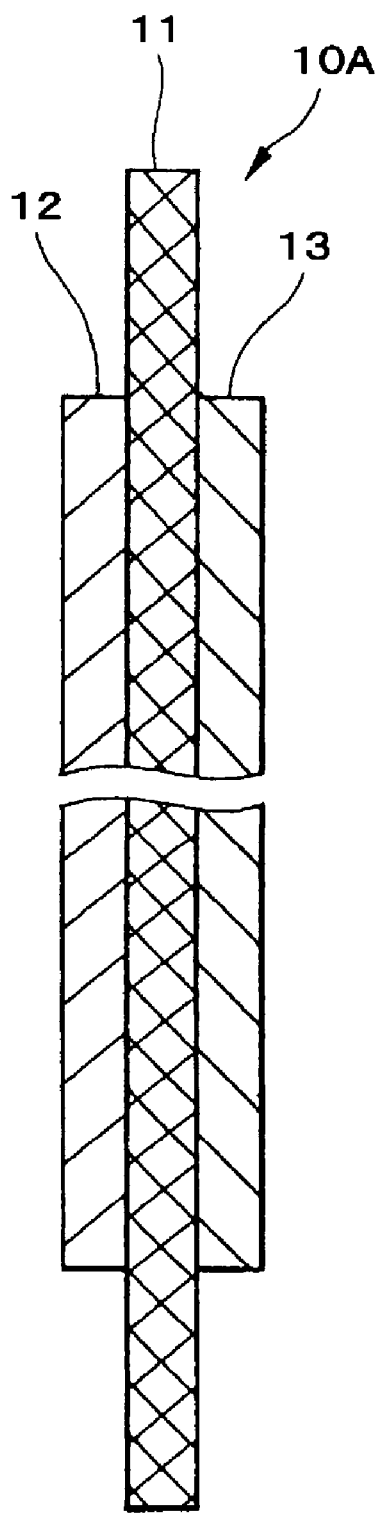
FIG. 2 is a sectional view of a unit cell.

As shown in FIG. 2, the unit cell 10A is composed of a solid polymer electrolyte membrane 11 interposed between a cathode 12, which is an oxidant electrode, stacked on one side thereof and an anode 13 stacked on another side thereof. The cathode 12 and the anode 13 have dimensions corresponding to housing portions R1, R2 that are formed in the separator 10B in FIG. 1, while the solid polymer electrolyte membrane 11 has a size slightly larger than the housing portions R1, R2. The thickness of the unit cell 10A, especially that of the solid polymer electrolyte membrane 11, is extremely thin compared to the thickness of the current collectors 14, 15 and the frame members 16, 17 which form the separator 10B. The outer shape of the unit cell 10A is dictated by the size of the cathode 12 and the anode 13 as shown in figures other than FIG. 2 which show the unit cell 10A.

Figure 3:
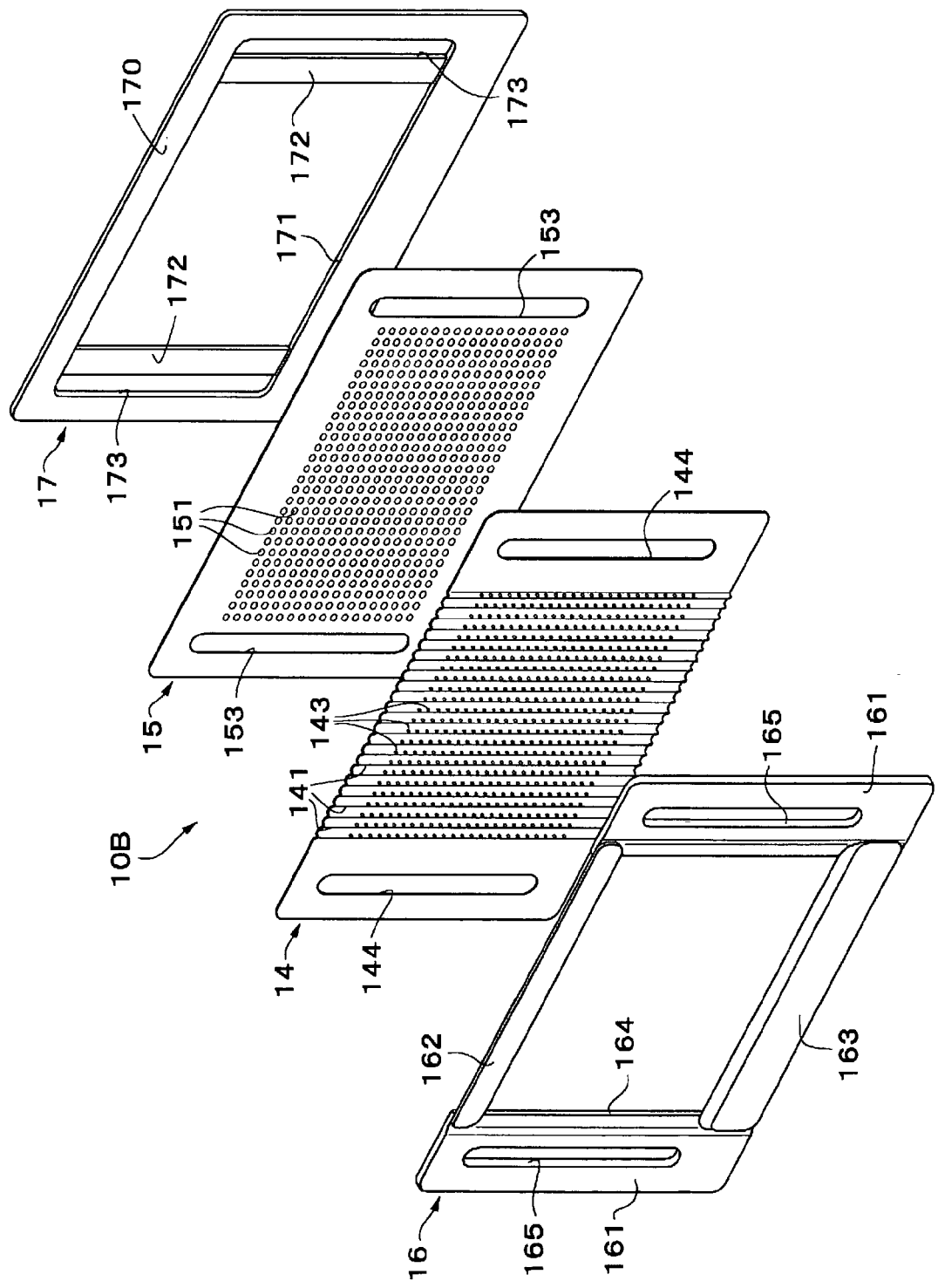
FIG. 3 is an exploded perspective view of a separator of the first embodiment.

The separator 10B, as shown in FIG. 3, comprises the current collectors 14, 15 that collect electric current by contact with the cathode 12 and the anode 13 of the unit cell 10A, and the frame members 16, 17 that are stacked thereon to support the unit cell 10A. In this embodiment, the current collectors 14, 15 are made of thin metal plates having a plate thickness of, for example, about 0.1 mm. This metal is a metal having electric conductivity and corrosion resistance, such as stainless steel, a nickel alloy, or a titanium alloy treated by a corrosion-prevention electroprocess.

One electric collector 14, which is made of a rectangular plate material, is pressed to form a plurality of lifted portions 141. These lifted portions 141 are linear and are parallel to a longitudinal side (a short edge side in the embodiment shown in FIG. 3) of the plate material, and the lifted portions 141 are arranged at even intervals and traverse the entire length of the plate surface. Although the cross-sectional shapes of the lifted portions 141 are roughly, as described in FIG. 1, rectangular and wavy, it is more practical to have such a shape slightly broadening at the bottom. Groove-shaped spaces S1, which are defined between these lifted portions 141, have a side opening to the cathode 12 (refer to FIG. 2) of the unit cell 10A and are used as air passages for supplying air to the cathode 12. A planar surface of a top 142 of each lifted portion 141 abuts the cathode 12. Groove-shaped spaces S2 defined on back side of the lifted portions 141 are used as cooling spaces (passages in this embodiment). Further, in order to provide limited communication between the air passage S1 and the cooling spaces S2, a plurality of through-holes 143 penetrating the current collector 14 are provided. These through-holes 143 may be arranged in any position, but are normally arranged on both sides of the lifted portions 141. Further, oblong holes 144 elongated in a longitudinal direction are formed in the vicinity of both ends of the current collector 14, extending in a horizontal direction in FIG. 1 (the longer edge in the embodiment shown in FIG. 3). When the current collector 14 is stacked with the current collector 15, the frame members 16, 17, and the separators 10B, these oblong holes 144 form hydrogen passages L1, L2 which pass through all of the members thus integrated.

Another current collector 15, which is a rectangular plate corresponding to the current collector 14, is pressed to form a plurality of lifted portions 151. Although the lifted portions 151 have flat tops 152, and a cross-sectional shape which is also practically the same as the rectangular and wavy shape of lifted portions 141, the lifted portions 151 in this embodiment are provided intermittently along the longitudinal dimension. Specifically, the lifted portions 151 are formed into circular or rectangular protrusions and their pitch (spacing) along the dimension of the longer edge is aligned with the pitch of the lifted portions 141 and the pitch in the longitudinal direction (short edge direction) is set at a proper interval. The cross-section of the left half in FIG. 1 shows a cut surface including the lifted portions 151, while the cross-section of the right half thereof shows a cut surface between the sections with lifted portions 151. A space S3 between these sections of lifted portions 151 constitutes a space open to the anode 13 (refer to FIG. 2) and serves as a hydrogen passage though which hydrogen, namely fuel, is passed. A planar top surface 152 of each lifted portion 151 abuts the anode 13. The other surface of the lifted portions 151 forms short cylindrical spaces S4, i.e., at the side facing the current collector 14, and merge with the spaces S2 of the current collector 14, so that as a consequence, both ends have openings at the long edges of the plate through the cooling space S2. Similar to the current collector 14, oblong holes 153 elongated in the direction of the short edge are formed in the vicinity of both longitudinal ends of the current collector 15. When the current collectors 14, 15 and the frame members 16, 17 are stacked and the separators 10B are layered, these oblong holes 153 form hydrogen passages L1, L2 which pass through each of the integrated members. In this embodiment, the lifted portions 151 take columnar shapes, each of which abuts the anode 13 over a small area. This defines, vertically and horizontally, the hydrogen passages S3 that run between the columnar lifted portions 151, and prevent hydrogen gas from being retained and stagnant. This also allows the area of the anode 13, with which the hydrogen gas comes into contact, to be enlarged, which may improve power generation efficiency.

The thus-structured current collectors 14, 15 are stacked so that both of the respective lifted portions 141, 151 face outside. Here, where there are no lifted portions 141 and 151, namely, a back surface of the hydrogen passage S3 and a back surface of the air passage S1 abut each other, to thereby enable power distribution between each other. In addition, stacking the current collectors 14, 15 results in forming the cooling spaces therebetween where a space S2 and a space S4 are merged. The unit cell 10A is stacked on the current collector 14 so that the openings of the spaces S1 are closed and tubular air passages are formed, which means that a part of the wall surrounding these passages is composed of the cathode 12. Air and water are supplied from this air passage S1 to the cathode 12 of the unit cell 10A. Similarly, the unit cell 10A is stacked on the current collector 15 so that the openings of the spaces S3 are closed to form fuel passages S3, which means that a part of the wall surrounding a passage S3 is composed of the anode 13. Then hydrogen is supplied from this fuel passage S3 to the anode 13 of the unit cell 10A.

The frame members 16, 17 are stacked on the thus-structured current collectors 14, 15, respectively. As shown in FIG. 1 and FIG. 3, the frame member 16 that is stacked on the current collector 14 has a longitudinal dimension slightly longer than that of the current collector 14. The frame member 16 includes longitudinal frame portions 161 connected by upper and lower horizontal frame portions 162, 163, and the area surrounded by these frame members is a window 164 to accommodate the lifted portions 141 of the current collector 14. Further, oblong holes 165 are also formed in the vicinity of both ends of the frame member 16 in a position and shape corresponding to the oblong holes 144 of the current collector 14. The horizontal frame portions 162, 163 of the frame member 16 and a part of the longitudinal frame portions 161 to which they are connected are thinner than the thickness of the remainder of longitudinal frame portions 161. Due to such a thickness relationship, the surfaces of the horizontal frame portions 162, 163 facing the current collector 14 are spaced from the current collector 14 over their whole short width. Therefore, when the frame member 16 is stacked on the current collector 14, the lifted portions 141 of the current collector 14 come into contact with the cathode 12 of the unit cell 10A within the window 164, while portions thereof abut the horizontal frame portions 162, 163. Thus, between the current collector 14 and the frame member 16, air passages extend through the entire longitudinal dimension in the form of a plurality of tubular spaces. These air passages are defined by the lifted portions 141 and an inside surface of the horizontal frame portion 162 in an upper portion, by the lifted portions 141 of the current collector 14 and the cathode surface 12 of the unit cell 10A in window 164, and by the lifted portions 141 of the current collector 14 and an inside surface of the horizontal frame portion 163 in a lower portion.

The frame member 17 that is stacked on the current collector 15 has the same size as the frame member 16, in which an opening bigger than a window 171 in the horizontal direction is formed in a body portion 170. Height of this opening defines the height of the window 171, while the width of the opening corresponds to the width between outer ends of both of the oblong holes 153 in the current collector 15. In the vicinity of both ends of this opening are a pair of longitudinal frame portions 172. The distance between the longitudinal frame portions 172 defines width of the window 171. The longitudinal portions 172 and the opening of the body portion 170 define long holes 173 that correspond to positions and shapes of the oblong holes 153. The longitudinal frame portions 172 are thinner than the body portion 170, so that the longitudinal frame portions 172 form a surface spaced from the current collector 15 by an amount equivalent to the height of the lifted portions 151 of the current collector 15. Therefore, when the frame member 17 is stacked on the current collector 15, the lifted portions 151 on the current collector 15 abut the longitudinal frame portions 172, while in the window 171 the lifted portions 151 come into contact with the anode 13 of the unit cell 10A. Thus, a portion sandwiched between the long holes 173 forms the hydrogen passage S3 running through the lifted portions 151.

Internal wall surfaces of the air passage S1 and the cooling space S2 are rendered hydrophilic. Specifically, it is preferable that these surfaces be treated so that the angle of contact between the internal surface and water becomes 40° C. or less, preferably 30° C. or less. In one method, a hydrophilic substance is applied to the surface. The hydrophilic substance to be applied may be polyacrylamide, polyurethane resin, titanium oxide ($TiO_2$), or the like. In other hydrophilic processes, a metal surface is roughened, for example by a plasma. It is preferable to apply the hydrophilic process to portions exposed to the highest temperatures, e.g., in order of: internal wall surface FI of the cooling space that is a back side of the tops 142 of the lifted portions 141 abutting the unit cell 10A; a side wall surface F2 of the air passage on the front side of the lifted portions 141 and a side wall surface F3 of the cooling space on the back side thereof; and a bottom surface F4 of the air passage. Further, the hydrophilic process may also be applied to an internal wall surface F5 of the lifted portions 151 that compose a part of the cooling space S2. Applying the hydrophilic process accelerates wetting of the internal wall surface, which enhances the cooling effect of the latent heat of evaporation of water.

Figure 4:
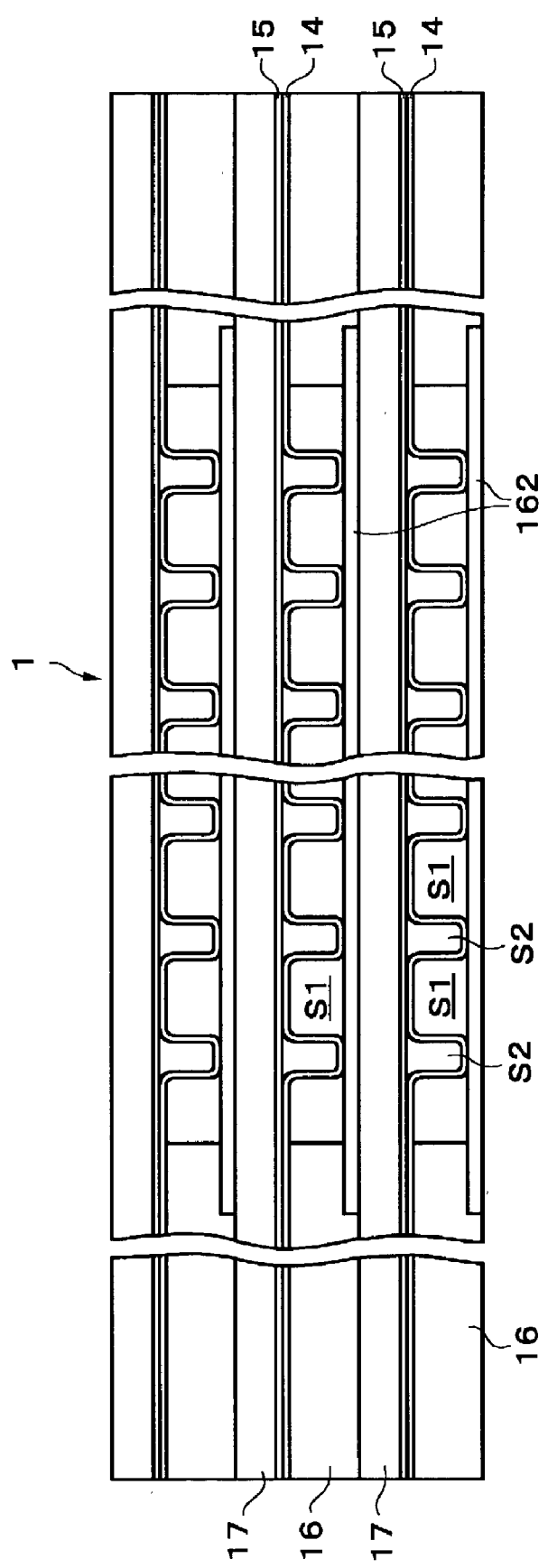
FIG. 4 is a partial top view of a fuel cell stack in which the electric cells of the first embodiment are layered.

The current collectors 14, 15 are held by the frame members 16, 17 of the separator 10B, and the separator 10B and the unit cell 10A are alternately stacked to form a fuel cell stack 1. As shown in FIG. 4, on an upper surface of the thus-layered fuel cell stack 1 are a large number of openings of the air passages S1 and openings of the cooling spaces S2 arranged alternately across the width of the fuel cell stack and additional linear arrays of openings with the same arrangement are layered at intervals of the thickness of the frame member 17 and the horizontal frame portion 162 of the frame member 16 combined, to form an intake for air and water. On a bottom surface of the fuel cell stack 1, a discharge for the air and the water has the same structure.

Figure 5:
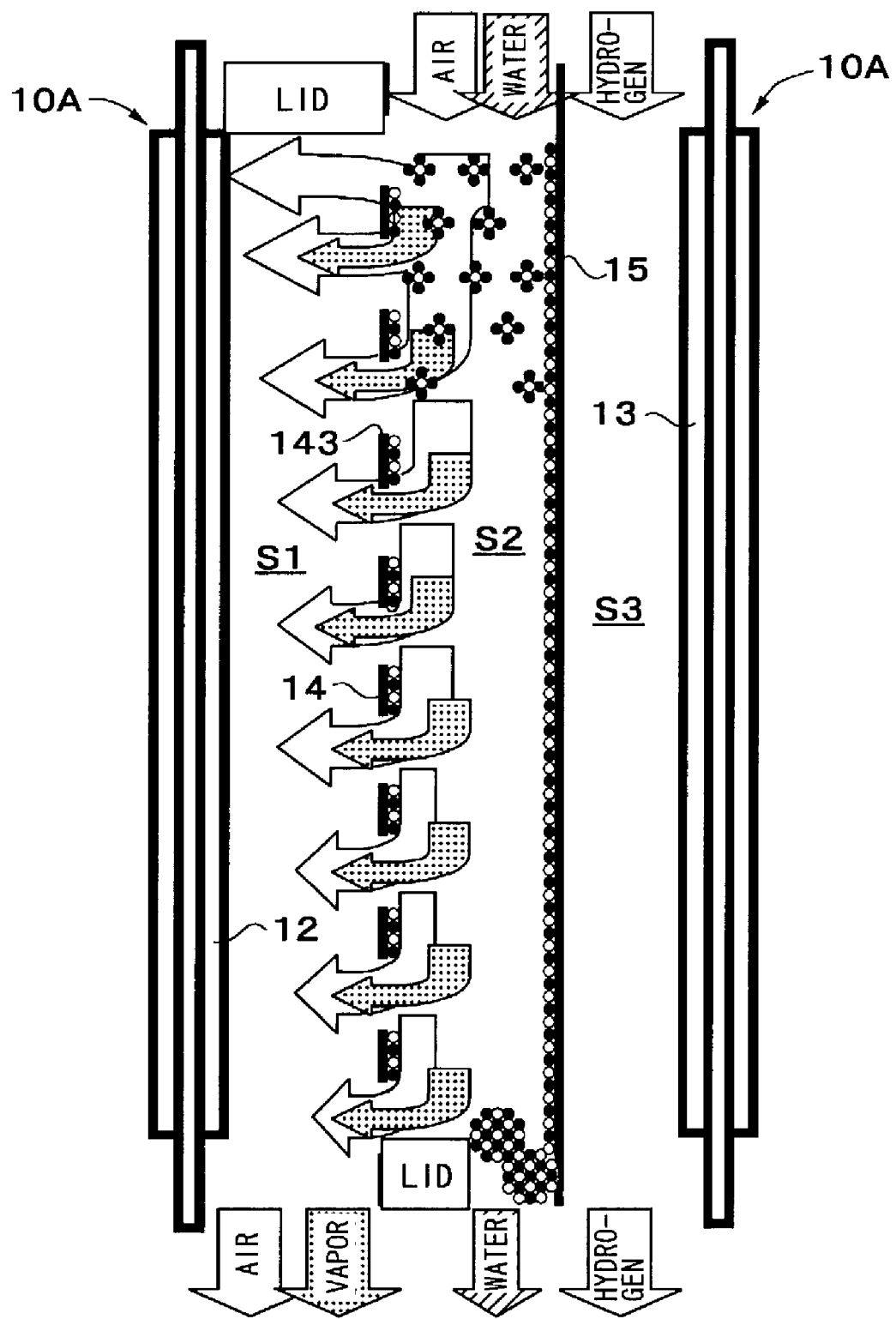
FIG. 5 illustrates the cooling mechanism provided by the separator in the first embodiment.

The thus-structured fuel cell stack operates as schematically shown in FIG. 5 by supplying air, water, and hydrogen to each electric cell. In this embodiment, the air and the water are uniformly supplied from an upper surface of the stack, with the upper ends of the air passages S1 closed with a lid to prevent the water from directly entering the air passages S1. If it is desired to supply the air and the water separately to the air passage S1 and to the cooling space S2, closing the air passage S1 is not necessarily required if the air passage S1 side is structured to be supplied only with the air. As shown in the figure, the air and the water supplied to the cooling space S2 enter the upper portion of the cooling space with water droplets nebulized to be mixed in airflow (hereinafter, such a state is referred to as mixed flow). In normal operation of the fuel cell, since the unit cell 10A generates heat by reaction, the mixed flow in the cooling space S2 is heated. The water droplets in the mixed flow adhere to a wall surface of the cooling space S2 which has been rendered hydrophilic, and the latent heat cooling of evaporation of the water draws heat from the wall surface. The water that is turned to vapor enters the air passage S1 from the through-holes 143 as shown with half-tone dot meshing arrowheads in the figure, together with the air whose flow is shown with outline arrowheads in the figure, and the water adheres to the cathode 12 side of the unit cell 10A to humidity the cathode 12. Then, excessive air and vapor, which have entered the air passage S1, are discharged from the air passage opening of the downward cell stack. On the other hand, air and water, which have not entered the air passage S1, are discharged from the cooling space S2 opening at the bottom of the cell stack.

Hydrogen is supplied to the fuel passage S3 from one of the hydrogen passages L1, L2 (refer to FIG. 1), passing through spaces between longitudinal frame portions 172 and the lifted portions 151. Thereby, the hydrogen is supplied to the anode 13 of the unit cell 10A. At the anode 13 side, excessive hydrogen entering the fuel passage S3 is discharged from the opposite end of the hydrogen passage to be discharged or collected by a pipe connected to this hydrogen passage.

As the above-described operation of this embodiment, mist-type droplets do not directly enter the air passage S1 with the airflow so that it is advantageous that the airflow current may not be occluded by the water droplets even in the extremely thin air passage S1 formed by the sheet metal pressing.

The air passages S1 and the cooling spaces S2 are alternately arranged along the electrode surface in parallel with each other, i.e., they are adjacent each other having a side wall of the lifted portion 141 therebetween. Since the air and the water flow along the sidewall, the sidewall operates as a cooling fin. Since the air passages S1 and the cooling spaces S2 are alternately arranged parallel each other, cooling efficiency of the fuel cell is improved by providing more uniform cooling.

When the separator 10B is thin inside the lifted portions 141, the temperature gap between a portion abutting on the heat-generating unit cell 10A and a portion spaced from the unit cell 10A widens. Therefore, the amount of vapor required for a saturated state differs within the air passage S1. For example, a portion on the high-temperature electrode side requires a greater amount of vapor for the saturated state than a portion spaced from the electrode. Such a temperature difference may cause drying of the cathode 12. In this embodiment, however, because of the cooling space S2 and the whole separator 10B being uniformly cooled, there is no partial temperature gap and a uniform saturated state is maintained within the air passage S1, which results in keeping the cathode 12 in a moist state.

Additionally, in this embodiment, the air and the water entering from the upper opening of the separator 10B cool the current collectors 14, 15 at the cooling space S2 side, mainly by latent heat cooling, but the area where such latent heat cooling occurs is not isolated by the air passage S1, which area is the back side of a portion where the current collectors 14, 15 directly abut on the electrode. Therefore, in the cooling space S2, the tops 142, 152 of the lifted portions 141, 151 are the closest to the electrode to receive heat and since they are directly cooled, it is possible to cool this portion effectively. Since the lifted portions 151 constitute a part of the cooling space S2, the abutting surface in contact with the anode 13 can also be directly cooled from the back side of the lifted portions 151, so that it is not necessary to separately provide a dedicated cooling passage to cool the anode 13, thereby simplifying the cooling passage.

The lifted portions 141, 151 of the current collectors 14, 15 are provided at even intervals, so that the air passages S1, the cooling spaces S2, and the fuel passages S3 are arranged at equal intervals, but the lifted portions 141, 151 are not limited to such a structure and the intervals may be changed depending on distribution or the like of the air and hydrogen flows. The directions of the air passages S1 and the fuel passages S3 may also be changed in any direction such as arranging in a radiation direction along a direction of gas flow. For example, when supplying water from an injection nozzle, since the water radiates from the injection inlet of the injection nozzle as a center, the lifted portions 141 may be arranged radially from the end of the nozzle. In such a structure the intervals between the lifted portions 141 may be small close to the injection nozzle (width of the air passage is small), and widen away from the injection nozzle (width of the air passage is widened).

Figure 6:
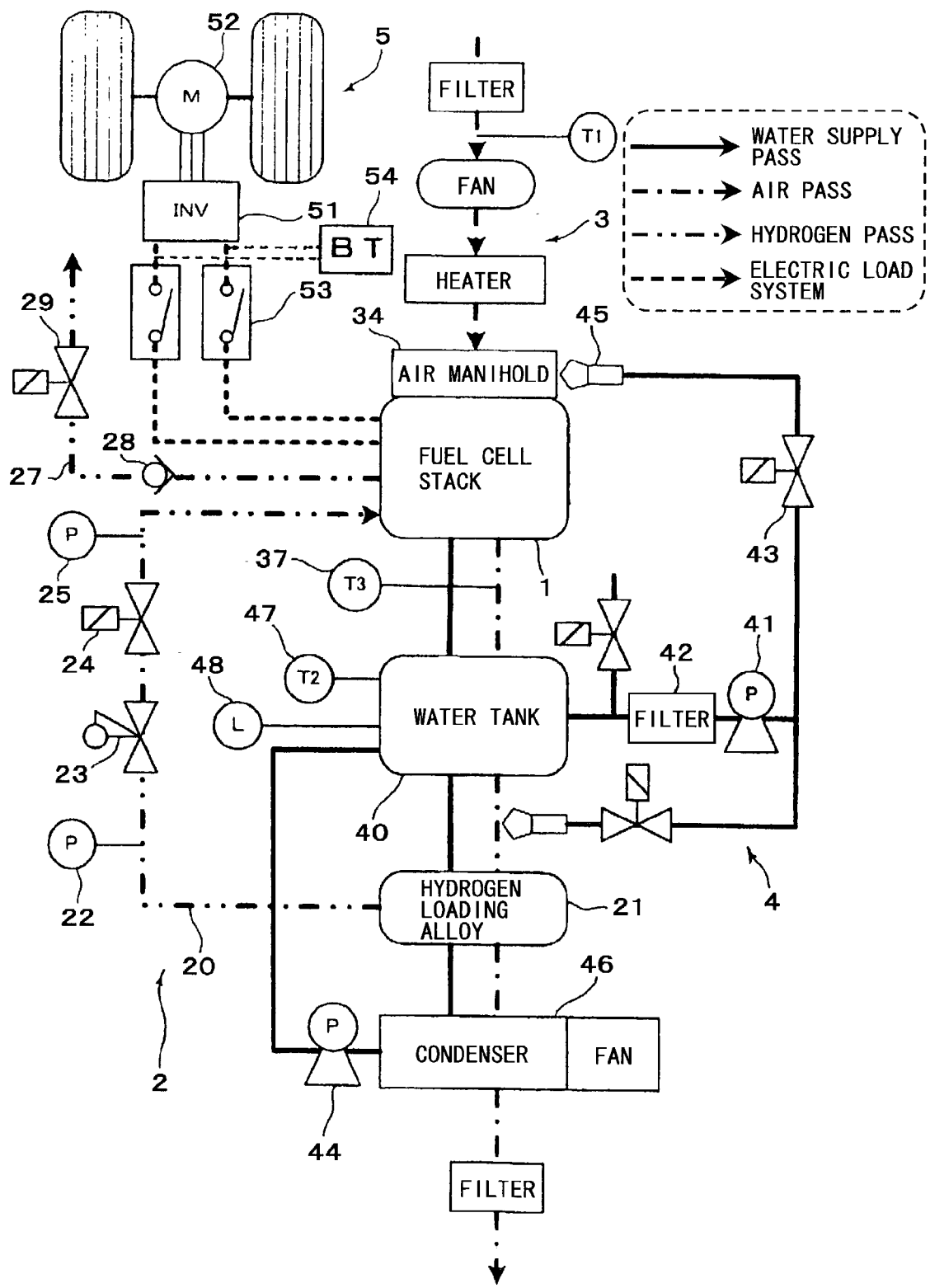
FIG. 6 is a block diagram of a fuel cell system.

FIG. 6 shows an example of a fuel cell system for vehicles using the fuel cell stack 1 related to application of this invention. This fuel cell system is composed of the fuel cell stack 1, a fuel supply system 2 including a hydrogen loading alloy 21 as a hydrogen supply means, an air supply system 3, a hydrogen supply system 4, and a load system 5.

In the fuel supply system 2, hydrogen emitted by the hydrogen loading alloy 21 through a hydrogen supply passage 20 is delivered to a hydrogen passage of the fuel cell stack 1 of fuel cells. In the hydrogen supply passage 20, a hydrogen primary pressure sensor 22, a hydrogen regulator 23, a hydrogen supply electromagnetic valve 24, and a hydrogen secondary pressure sensor 25 are provided in the foregoing order, from the hydrogen loading alloy 21 side to the fuel cell stack 1 side. The hydrogen primary pressure sensor 22 monitors hydrogen pressure on the hydrogen loading alloy 21 side. The hydrogen regulator 23 adjusts the hydrogen pressure to a pressure appropriate for supplying the hydrogen to the fuel cell stack 1. Hydrogen supply to the fuel cell stack 1 is electrically controlled by opening and closing of the hydrogen supply electromagnetic valve 24, and this electromagnetic valve 24 is closed to stop the hydrogen gas supply. The hydrogen secondary pressure sensor 25 monitors the hydrogen gas pressure just before the hydrogen gas is supplied to the fuel cell stack 1.

In the fuel supply system 2, the hydrogen gas discharged from the hydrogen passage of the fuel cell stack 1 is emitted to the atmosphere via a hydrogen discharge passage 27. The hydrogen discharge passage 27 is provided with a check valve 28 and an electromagnetic valve 29. The check valve 28 prevents air from entering the anode of the fuel cell stack 1 via the hydrogen discharge passage 27. The electromagnetic valve 29 is intermittently driven to attempt complete combustion of the hydrogen.

In the water supply system 4, water from a tank 40 is supplied by a pump 41 to a nozzle 45 in an air manifold 34, and the water is continuously or intermittently sprayed therefrom into the air manifold 34. This water is delivered to the air passage SI and to the cooling space S2 via an upper opening of the fuel cell stack 1. Here, latent heat is preferentially taken out of the moisture so as to prevent the moisture on the cathode side of the solid polymer electrolyte membrane 11 from evaporating. Therefore, the solid polymer electrolyte membrane 11 is not dehydrated at the cathode 12 side and is always maintained in a uniformly moist state by generated water. Further, vapor supplied on the surface of the cathode 12 also takes heat from the cathode 12 itself to cool it, and water entering the cooling space S2 also removes heat. Thereby, temperature of the fuel cell stack 1 can be controlled.

This means that even if a cooling water system is not added to the fuel cell stack 1, the fuel cell stack 1 can be fully cooled. Output of the pump 41 is controlled depending on the temperature of exhaust air detected by the exhaust temperature sensor 37 to maintain the fuel cell stack 1 at a desired temperature. A filter 42 is provided at the intake side of the pump 41, an electromagnetic valve 43 is provided between the nozzle 45 and the pump 41, and the electromagnetic valve 43 controls the quantity of water supplied from the nozzle 45. The water in the tank 40 is supplied from the nozzle 45, which is located in the air manifold 34, to a surface of the fuel cell stack 1, collected in a water condenser 46, and then returned to the tank 40 by the pump 44. A water temperature sensor 47 monitors water temperature in the tank 40 and a water level sensor 48 monitors water level.

The load system 5 receives output of the fuel cell stack 1 via an inverter 51 to drive the load of a motor 52 or the like. This load system 5 is provided with a relay 53 for switching. A battery 54 is connected between the relay 53 and the inverter 51. This battery 54 accumulates regenerative current of the motor 52, and in a case of lack of fuel cell output, the output is supplemented.

This system is characterized in that the air passage S1 and the cooling passage S2 in the fuel cell stack 1 can be integrated into a single passage and the air and water can be simultaneously passed therethrough, so that a device for cooling need not be additionally provided.

In the above-described first embodiment, the passages on the anode 13 side are formed with planar surfaces so that the lifted portions 151 of the current collector 15, which is connected to the anode 13, are intermittently arranged and have columnar shapes, but when this passage has a groove-shape similar to the air passages 81, the lifted portions 151 may be formed into a series of protrusions. The second embodin1ent shown in FIG. 7 to FIG. 12, has such a structure.

Figure 7:
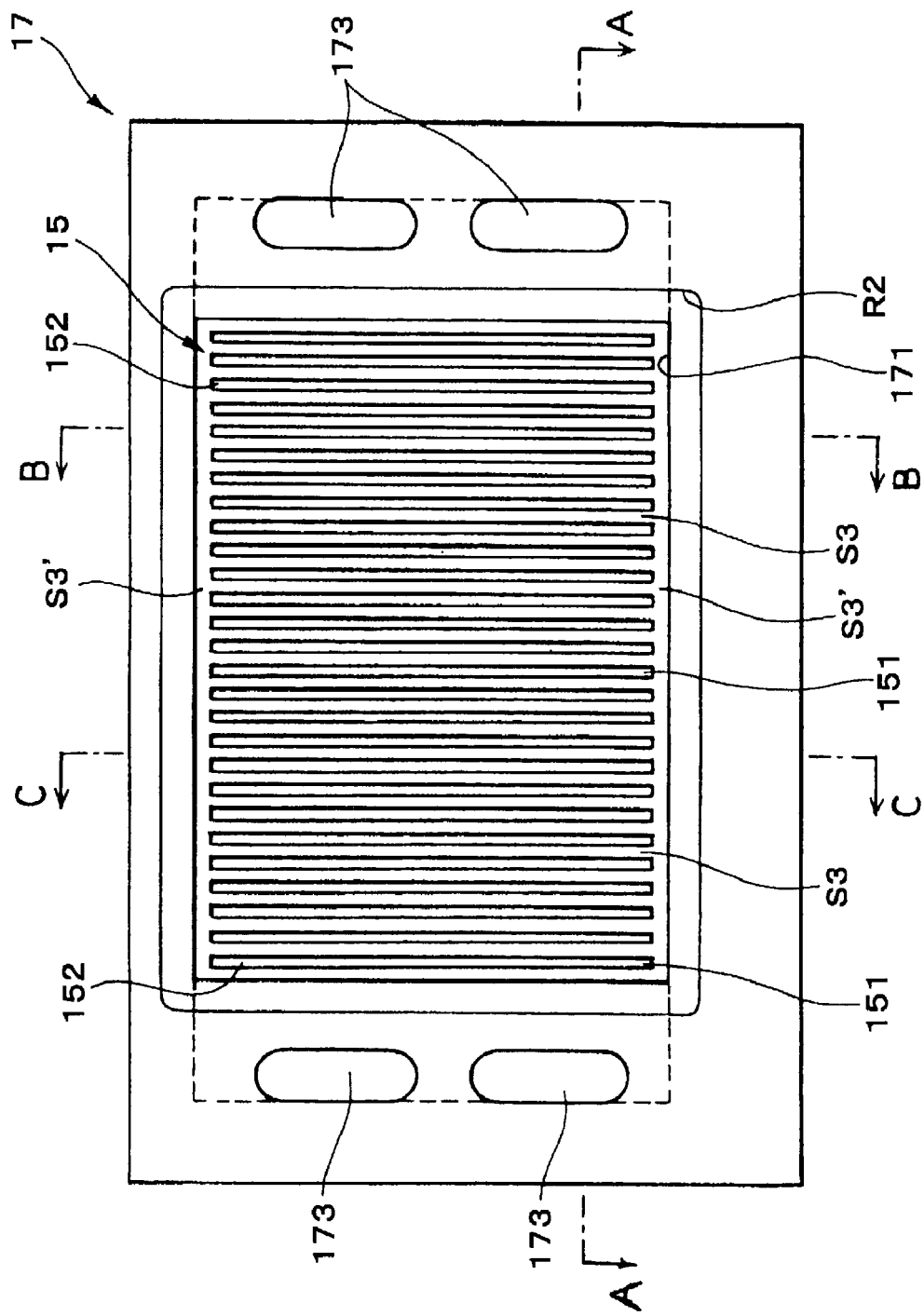
FIG. 7 is a front view of an entire separator according to a second embodiment of the present invention.
Figure 8:
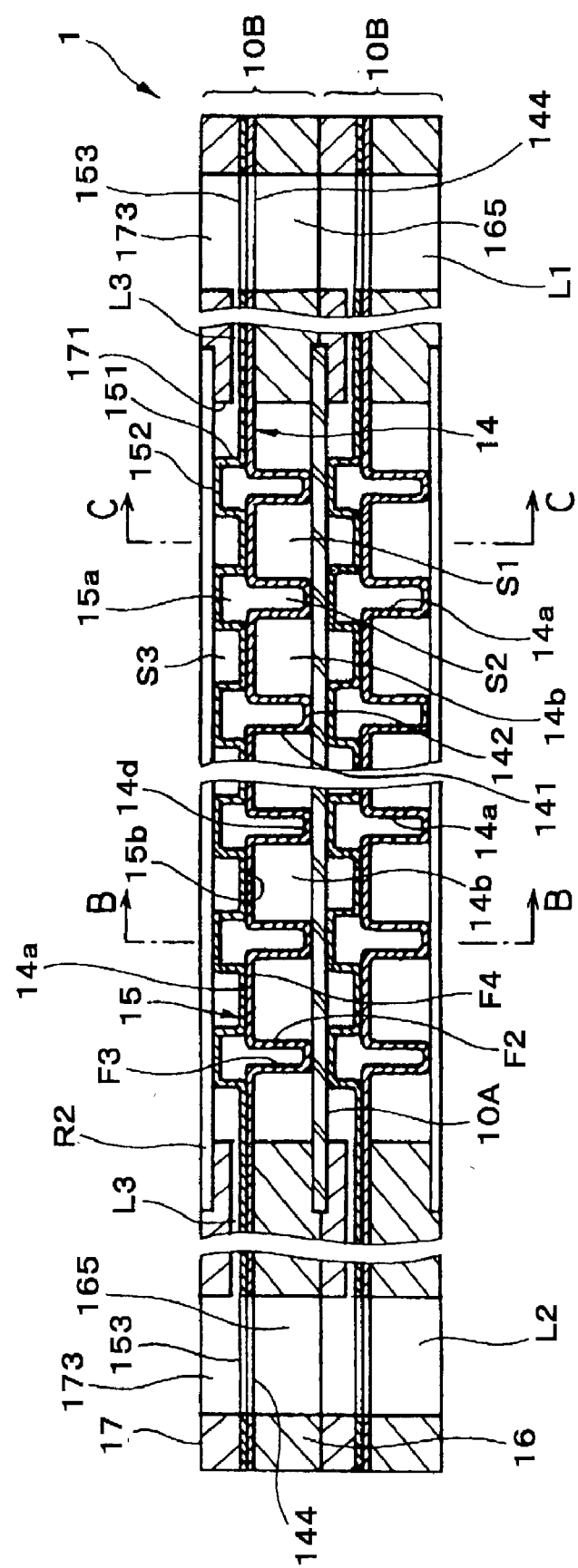
FIG. 8 is a partial horizontal view of a fuel cell stack of the second embodiment.
Figure 9:
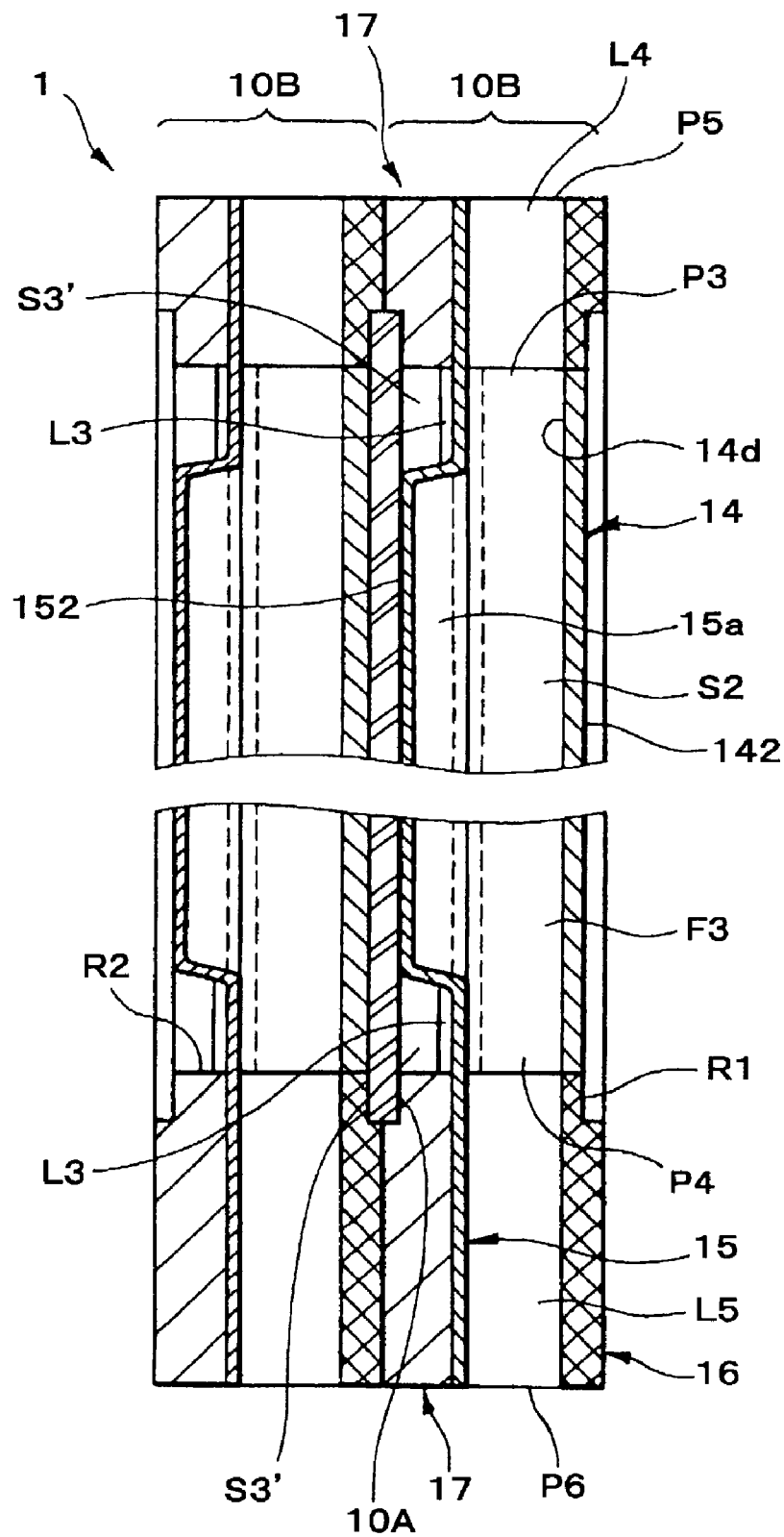
FIG. 9 is a vertical sectional view taken along line B—B in FIG. 8.

In the second embodiment as shown in FIG. 8, the separator 10B comprises the current collectors 14, 15 for receiving current to the outside by abutting the electrode of the unit cell 10A. The current collectors 14, 15 are plates of the same metal as in the first embodiment. The current collector 15 abuts the anode of the unit cell 10A, while the current collector 14 abuts the cathode thereof. As shown in FIG. 7, the current collector 15, which is a rectangular plate, has a plurality of lifted portions 151 formed by pressing. The lifted portions 151 are arranged in a succession of linear-shapes evenly spaced parallel to the short edge of the plate. Grooves between the lifted portions 151 form the hydrogen passages S3, through which hydrogen is fed as a fuel. The top surface of the lifted portion 151 abuts the anode. Grooves 15$a$ are formed on the back side of the lifted portions 151 and, as shown in FIG. 9, the ends of these grooves 15$a$ do not reach the end sides of the plate so that both ends thereof are occluded. Holes 153 are formed at both ends of the current collector 15 serve as hydrogen supply passages when the separator 10B is stacked.

Figure 11:
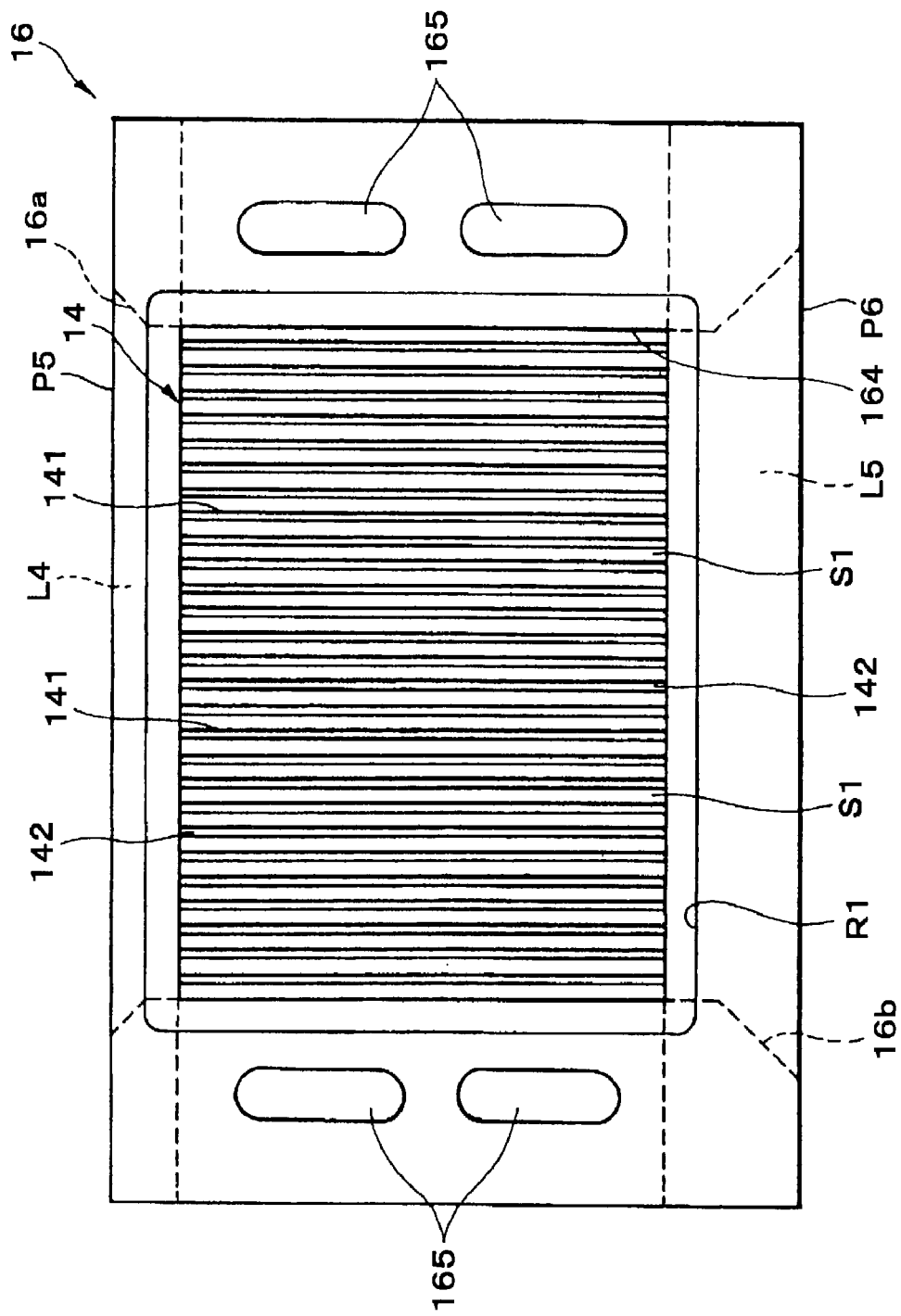
FIG. 11 is a rear view of the entire separator of the second embodiment.

As shown in FIG. 11, on the current collector 14, which is a rectangular plate, a plurality of lifted portions 141 are formed by a press. These lifted portions 141 are formed as a succession of linear-shapes in parallel with the short edge of the plate, and the lifted portions 141 are arranged at even intervals. Grooves between the lifted portions 141 form the air passages S1. The top surface 142 of the lifted portion 141 abuts the cathode. On the back sides of the lifted portions 141 hollow portions are formed as the cooling passages S2. The air passages S1 and the cooling passages S2 reach the edges of the plate and both ends open at the side edges of the plate. Holes 144 are formed at both ends of the current collector 14 and serve as hydrogen supply passages 144 when the separator 10B is stacked.

Figure 10:
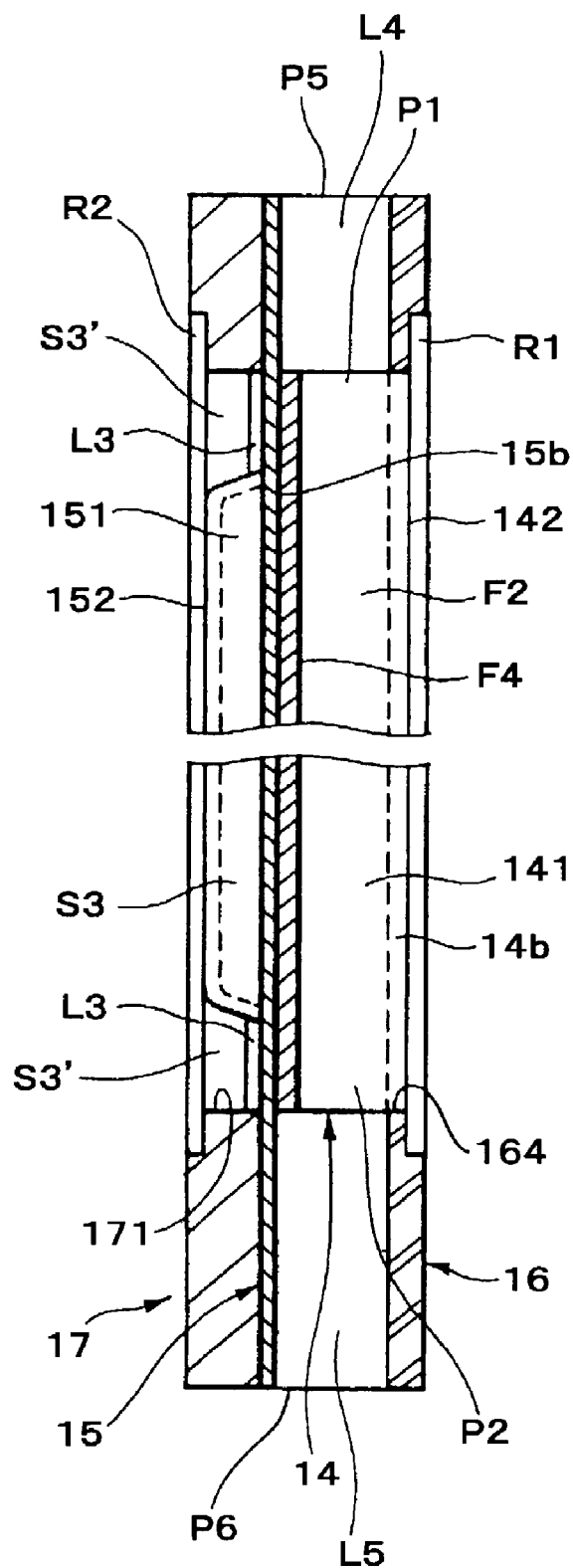
FIG. 10 is a vertical sectional view taken along line C—C in FIG. 8.

The above-described current collectors 14, 15 are stacked with the respective lifted portions 141, 151 facing outside. The back surface 15$b$ of the hydrogen passage S3 abuts a back surface 14$a$ of an air passage S1, to thereby enable power distribution with each other. In addition, stacking the current collectors 14, 15 results in forming the cooling passages S2 as shown in FIG. 9, wherein the grooves 15a constitute part of the cooling passages S2. The air passage S1 is stacked on the unit cell 10A as shown in FIG. 8 and FIG. 10, to form a tubular passage by closing the opening 14b of the groove, wherein a part of the internal wall of the tubular passage is formed by the cathode. Oxygen and water are supplied through this air passage S1 to the cathode of the unit cell 10A.

The opening at one end of the air passage S1 serves as an introduction port P1 to which air and water are introduced, while the opening at the other end serves as a discharge port P2 from which air and water exit. The opening at one end of the cooling passage S2 serves as an inlet port P3 to which air and water are introduced, while the opening at the other end serves as an outlet port P4 from which air and water exit. In the above-described structure, the air passages S1 and the cooling passages S2 are alternately arranged in parallel with each other and adjacent each other with a side wall 14c sandwiched therebetween. Therefore, the introduction port P1 and the inlet port P3 are also alternately arranged and the discharge port P2 and the outlet port P4 are also alternately arranged. Further, air and water flow along the sidewall 14c, so that the sidewall 14c serves as a cooling fin. Since the air passage S1 and the cooling passages S2 are alternately arranged in parallel with each other, cooling efficiency of the fuel cell is improved to provide uniform cooling.

The frame members 16, 17 are stacked on the current collectors 14, 15, respectively. As shown in FIG. 7, the frame member 17 that is stacked on the current collector 15 has the same size as the current collector 15 and a window 171 is formed in the center thereof to accommodate the lifted portions 151. Further, holes 173 are formed in the vicinity of both ends of the frame member 17 in a position corresponding to the holes 153 of the current collector 15 and between these holes 173 and the window 171, recesses are formed on a planar surface of the side abutting the current collector 15 so as to provide a hydrogen passage L3. The planar surface of frame member 17, opposite the surface abutting the current collector 15, has a recessed rim portion R2 surrounding the window 171 for housing the unit cell 10A.

As shown in FIG. 7, FIG. 9, and FIG. 10, there is a gap between the ends of the lifted portions 151 and an internal wall on the sides of the window 171 of the frame member 17, which gap forms a hydrogen passage S3' parallel to the long edge of the current collector 15. This hydrogen passage S3' supplies hydrogen to each hydrogen passage S3. In addition, the hydrogen passage S3' also supplies hydrogen to the anode.

The frame member 16 that is stacked on the current collector 14 has the same size as that of the frame member 17, and a window 164 is formed in the center thereof to accommodate the lifted portions 141. Further, holes 165 are formed in the vicinity of both ends of the frame member 16 in positions corresponding to the holes 173 of the frame member 17. On the surface of the frame member 16 on which the current collector 14 is stacked, grooves are formed parallel to the long edge sides, facing each other, and stacking the current collectors 14, 15 thereon results in forming air passages L4, L5. One end of the air passage L4 is connected to an opening P5 in an edge surface of a long edge side of the frame member 16, while the other end thereof is connected to the introduction port P1 of the air passage S1 and the inlet port P3 of the cooling passage S2.

An upstream portion of the air passage L4 has the internal wall of the end portions formed as a tapered surface 16a with a cross-sectional area which decreases from the opening P5 side to the air passage S1 side, which facilitates absorbing nebulized water emitted from the previously mentioned air manifold 34. One end of the air passage L5, i.e. the downstream end, is connected to the discharge port P2 of the air passage S1 and the outlet port P4 of the cooling passage S2, while the other end thereof is connected to the opening P6 formed in an edge surface of a long edge side of the frame member 16. The air passage L5 has the internal wall of its end portions formed as a tapered surface 16b, with a cross-sectional area which decreases from the opening P6 side to the air passage S1 side. Even when the fuel cell stack 1 is tilted, this tapered surface 16b continues to discharge water. A planar surface of the frame member 16, which is opposite the surface abutting the current collector 14, has a recessed portion surrounding the window 164 to provide a housing portion R1 to house the unit cell 10A.

The structure of the unit cell 10A in this embodiment is the same as that of the first embodiment shown in FIG. 2. The same portions of the passages are rendered hydrophilic as in the first embodiment.

Figure 12:
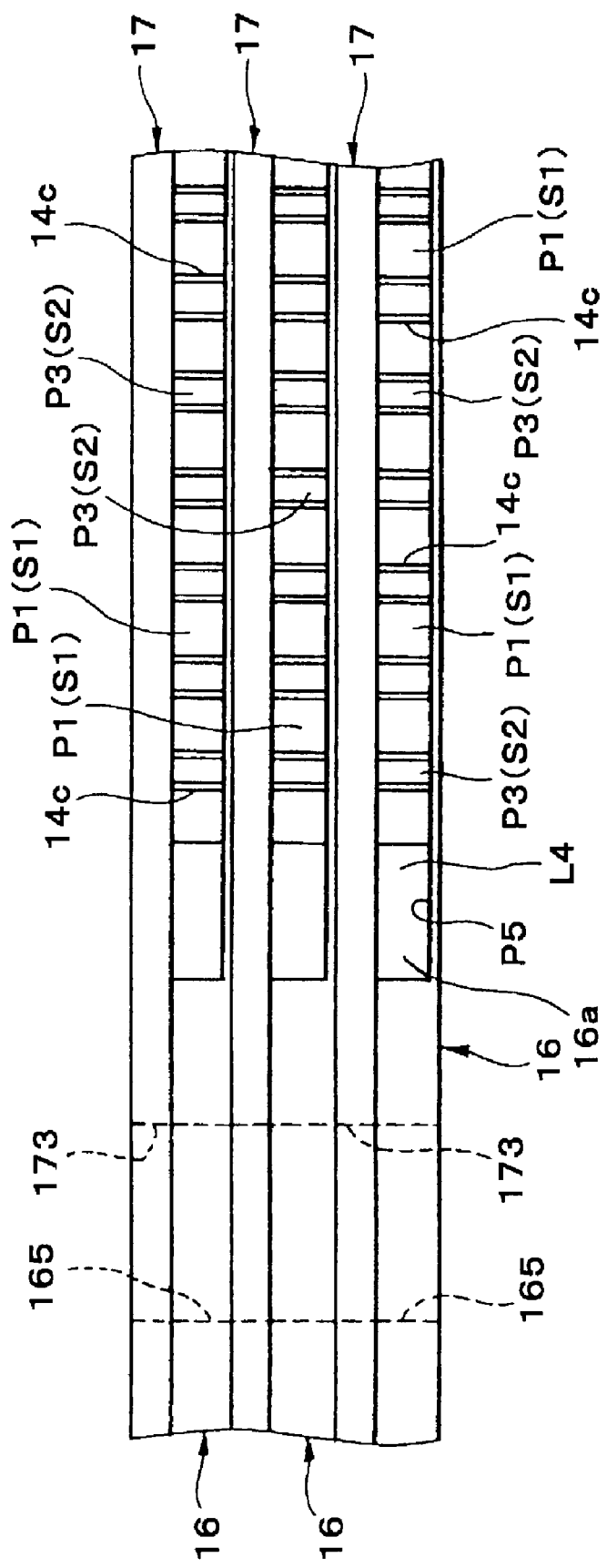
FIG. 12 is a partial top view of the fuel cell stack of the second embodiment.

The thus-structured frame members 16, 17 hold the current collectors 14, 15 to form the separator 10B, and the separator 10B and the unit cell 10A are alternately layered to form the fuel cell stack 1. FIG. 12 is a partial planar view of the fuel cell stack 1. On an upper surface of the fuel cell stack 1, a large number of introduction ports PI and inlet ports P3 are alternately open, and as previously noted, air flows in from the air manifold 34 and water emitted from the nozzle 45 simultaneously flows into the introduction ports PI and the inlet ports P3. The sidewall 14c in the air passage operates as a cooling fin.

When the separator is thin and a space (S2) is provided inside the lifted portions 141, a temperature gap between the portion abutting the heat-generating unit cell 10 and portions not abutting the unit cell 10A broadens. Therefore, the amount of vapor required for a saturated state differs within the air passage. For example, a portion of the high-temperature electrode side requires a greater amount of vapor to have the saturated state than a portion apart from the electrode. Such a temperature difference may cause drying of the cathode, but the cooling passage S2 allows uniform cooling of the whole separator, to thereby prevent a partial temperature gap and maintain a uniform saturated state within the air passage S1, which results in keeping the cathode in a moist state.

The air and the water flowing in from the introduction port P1 and the inlet port P3 provide the cathode with water within the air passage S1 to cool the current collectors 14, 15 by the latent heat of evaporation. The air and the water flowing in from the inlet port P3 similarly cool the current collectors 14, 15 with the latent heat of evaporation. Here, an internal wall 14d is the closest to the electrode in the cooling passages S2 to receive heat, but can be efficiently cooled by the flow of the air and water into the cooling passage S2. Since the groove 15a constitutes a part of the cooling passage S2, the surface 152, on which the hydrogen electrode abuts, can also be directly cooled from its back side and from the hydrogen electrode side as well, so that cooling efficiency may be further enhanced.

The above-described lifted portions 141, 151 of the current collectors 14, 15 are both provided at even intervals, so that the air passage S1, the cooling passage S2, and the hydrogen passage S3 are all arranged at equal intervals, but the lifted portions 141, 151 are not limited to such a structure and the spacings may be changed depending on distribution or the like of the air flow. The arrangement directions of the air passage S1 and the hydrogen passage S3 are not necessarily parallel to each other and they may be changed in any direction such as in a radial direction along a direction of gas flow. For example, when supplying water from the injection nozzle, since the injected water radiates from the injection inlet of the injection nozzle as a center, the lifted portions 141 may be arranged radially from the end of the nozzle. Alternatively, the intervals between the lifted portions 141 may be small close to the injection nozzle (width of the air passage is small), and larger away from the injection nozzle (width of the air passage is widened).

The above-described second embodiment is characterized in that the air passage S1 and the cooling passage S2 are united into one, and the air and the water can be simultaneously passed therethrough, so that a separate device for cooling need not to be additionally provided.

Figure 13:
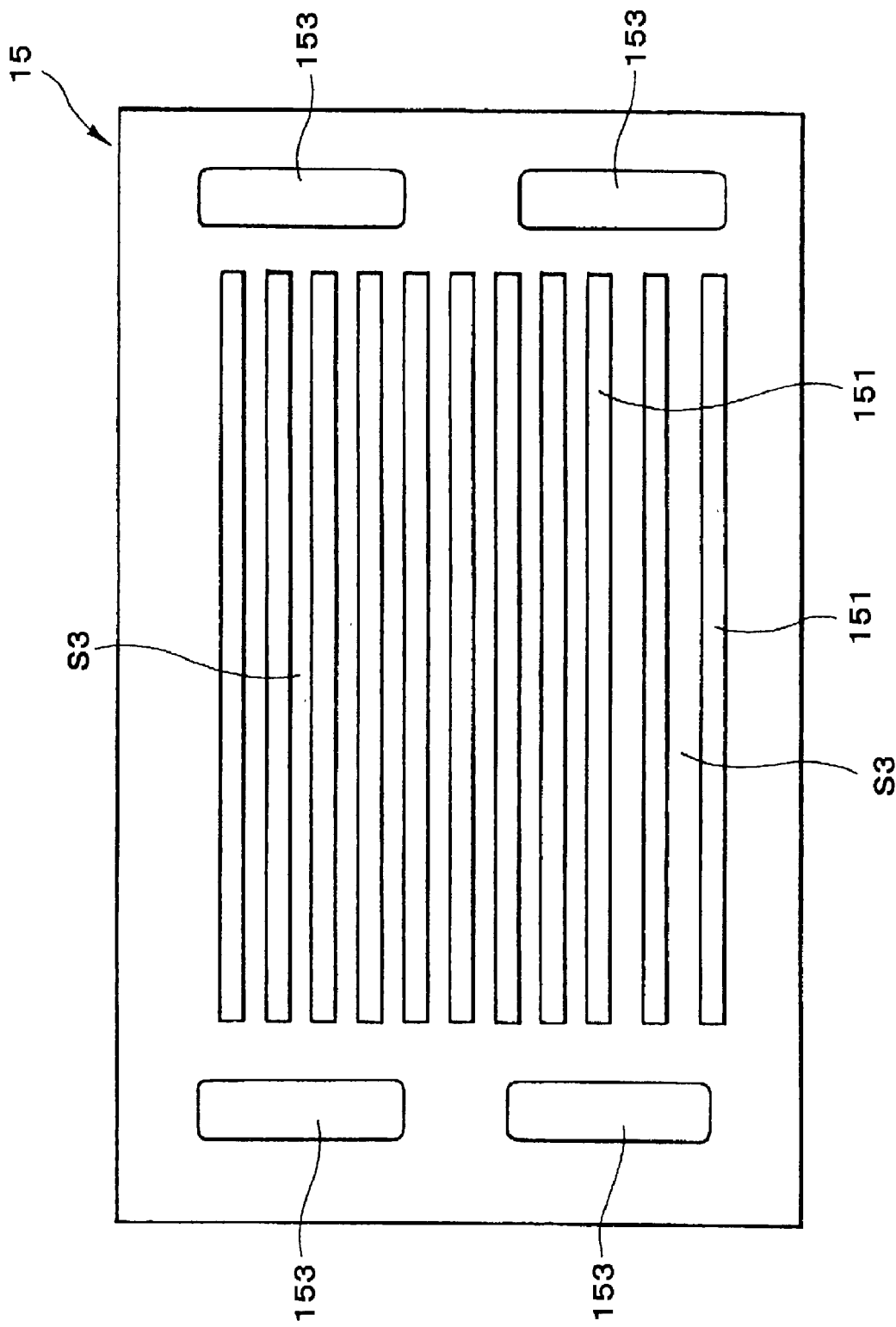
FIG. 13 is a front view of a modification of the separator of the second embodiment.

In a modification of the second embodiment, the passage on the anode side may have other structure. In the modification shown in FIG. 13 the lifted portions 151 of the current collector 15 that connect to the anode are linearly formed parallel to the long edge of the current collector 15. Adopting this structure may present such an advantage that the hydrogen passage S3 is arranged in the direction of the hydrogen gas flow so that the hydrogen gas flow is less stagnant.

Figure 14:
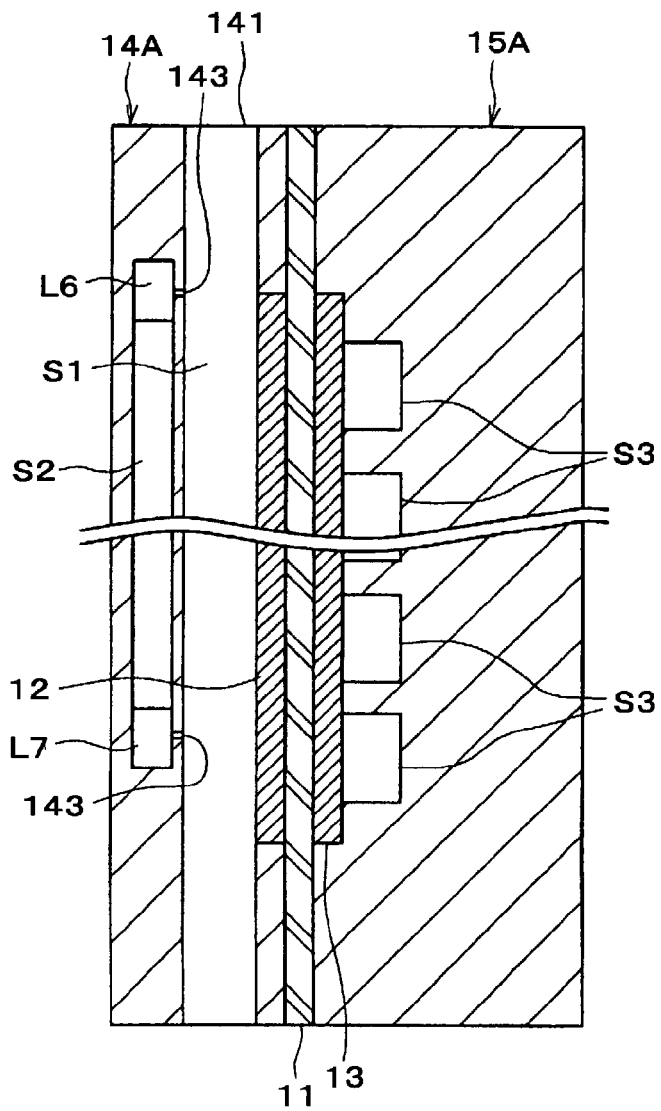
FIG. 14 is a side sectional view of a fuel cell unit of a fuel cell of a third embodiment of the present invention.
Figure 15:
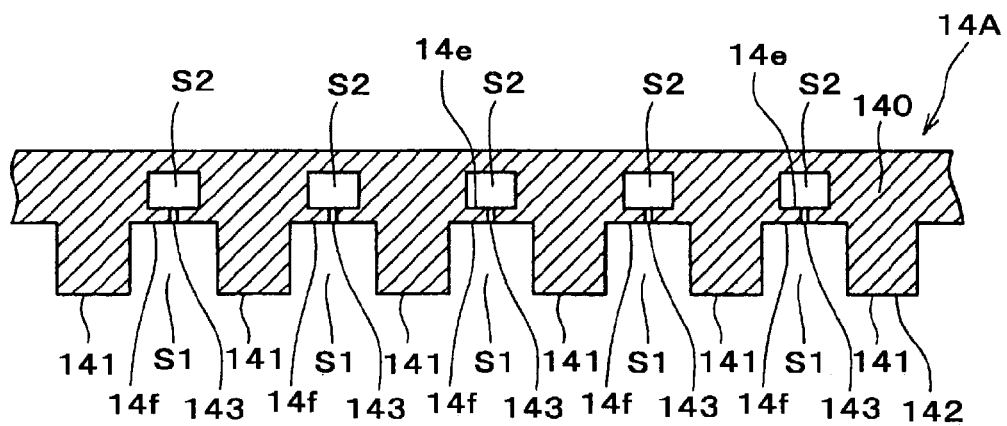
FIG. 15 is a partial horizontal sectional view of a separator of the fuel cell of the third embodiment.

Although each of the above-described embodiments have a separator that is mainly formed by pressing, the separator may also be formed from carbon as in the third embodiment described below. As shown in FIG. 14, in this third embodiment, a unit of the fuel cell is composed of: a unit cell comprising a solid polymer electrolyte membrane 11, and a cathode 12 that is an oxidant electrode and an anode 13, which are stacked on both sides of the solid polymer electrolyte membrane 11 respectively; a separator 14A stacked on the cathode 12 of the unit cell; and a separator 15A stacked on the anode 13. Specifically, the solid polymer electrolyte membrane 11 is interposed between the cathode 12 and the anode 13 to form the unit cell sandwiched between the separators 14A, 15A.

The separators 14A, 15A have electric conductivity and are made of a material having corrosion resistance, such as graphite, which has both electric conductivity and corrosion resistance. Other materials having electric conductivity and corrosion resistance are metals, for example, stainless steel, a nickel alloy, a titanium alloy, or the like with a corrosion-resistant coating.

A plurality of oxidant gas supplying grooves are formed in parallel on a surface of separator 14A abutting the cathode 12 (one end surface), at substantially even intervals, and an air supply passage S1 is formed with the cathode 12 stacked thereon. The air supply passage S1 is formed from one long edge of the separator 14A to the other long edge thereof, and opens at each long edge. Partition walls are formed between the passages S1 by the lifted portions 141, and the top portions 142 thereof abut the cathode 12.

Figure 16:
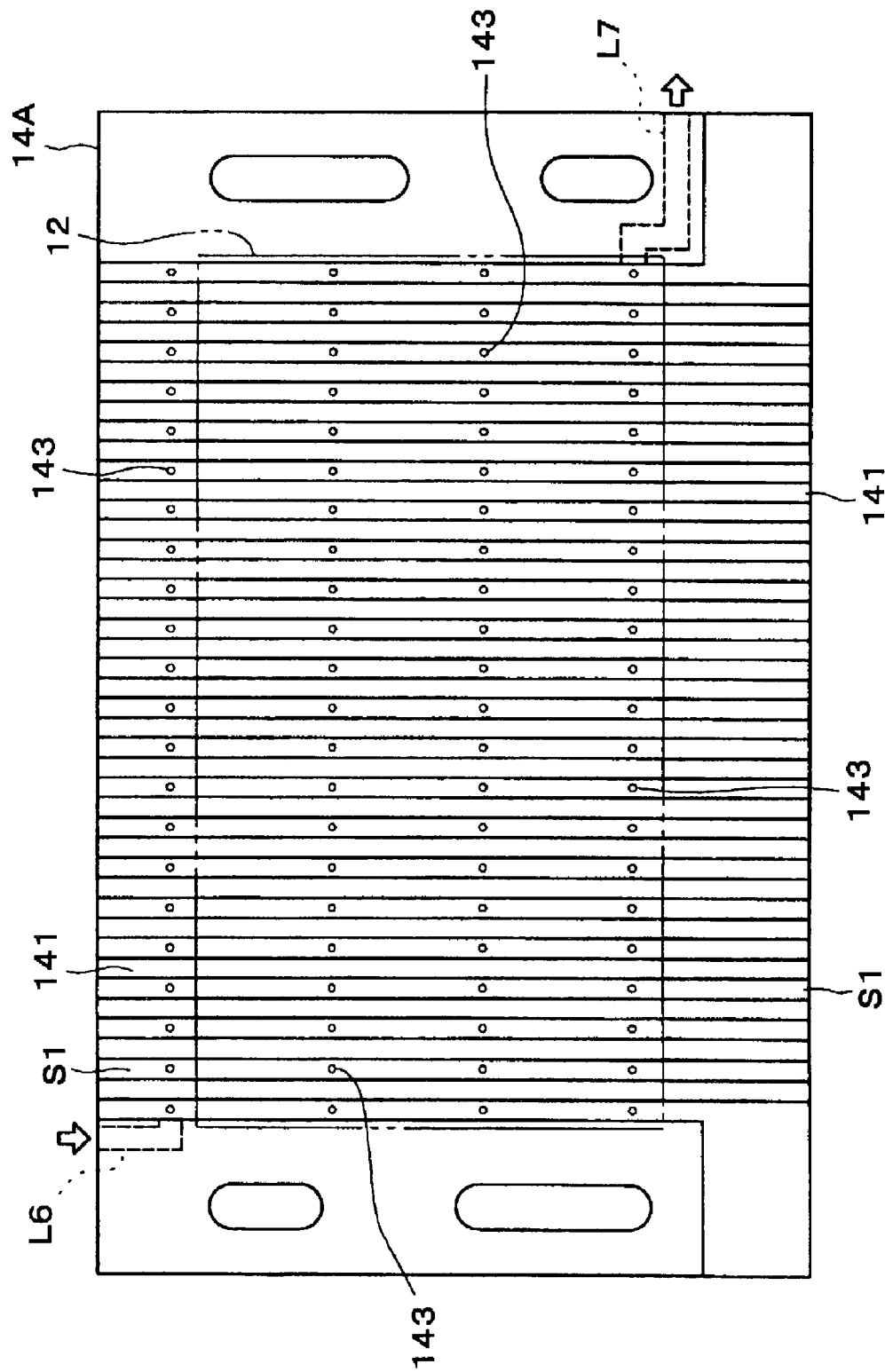
FIG. 16 is a front view of the entire separator of the fuel cell of the third embodiment.

The separator 14A comprises a plate-shaped body portion 140 provided with the air supply passages S1 and wall partitions 141, and in the body portion 140, cooling passages S2 are formed along the air supply passages S1. As a cooling medium to cool the fuel cell, water passes through the cooling passages S2. The cooling passages S2 are respectively formed along a plurality of the air supply passages S1 that are formed in the separator 14A, and as shown in FIG. 16, one end of each of the cooling passages S2 is connected to a supply passage L6 and the other end is connected to a discharge passage L7. The supply passage L6 is connected to a supply line 40a in a water supply system 4, which is provided outside of the fuel cell stack 1. The discharge passage L7 is connected to an exchange line 40b and water not supplied to the air supply passages S1 is returned to a water tank 40 so that cooling water circulates between the fuel cell stack 1 and the water tank 40. As such, the cooling water passes through from one edge of the separator 14 A to the opposing side.

Through-holes 143 provide communication between the air supply passages S1 and the cooling passages S2 as a supply means for supplying water to the air supply passages S1. The through-holes 143 are provided at equal intervals and the cooling water from the cooling passages S2 enters the air supply passages S1 via the through-holes 143. The water supplied from the through-holes 143 to the air supply passages S1 exercises a cooling effect by latent heat of evaporation to prevent drying of the cathode 12, and to maintain a moist state.

The cooling water need not fully fill in the cooling passages S2 and the amount of flow may be such that the water rolls on an internal wall of the cooling passage S2. Thereby, for example, when the water rolls on side surface 14e, the water flows through the through-holes 143 to the air supply passages S1, but when the water rolls on a different side surface, the water may not flow into the air supply passages S1. However, when the water rolls on an internal wall of the cooling passage S2, the separator 14A is cooled to obtain a sufficient cooling effect.

Gas supply passages 53 are formed on the anode 13 side of the separator 15A, through which fuel gas passes. The gas supply passages S3 are formed in a direction orthogonal to the air supply passages S1 with the unit assembled. It is also possible to provide a passage on the separator 15A the same as the cooling passage S2, which is provided on the separator 14A and through which the cooling medium passes.

In this embodiment, the air supply passages S1 are positioned running vertically, with the fuel cell unit oriented for use. Such a structure allows the cooling water supplied to the air supply passages S1 to drop by gravity and easily discharge from the air supply passages S1.

Figure 17:
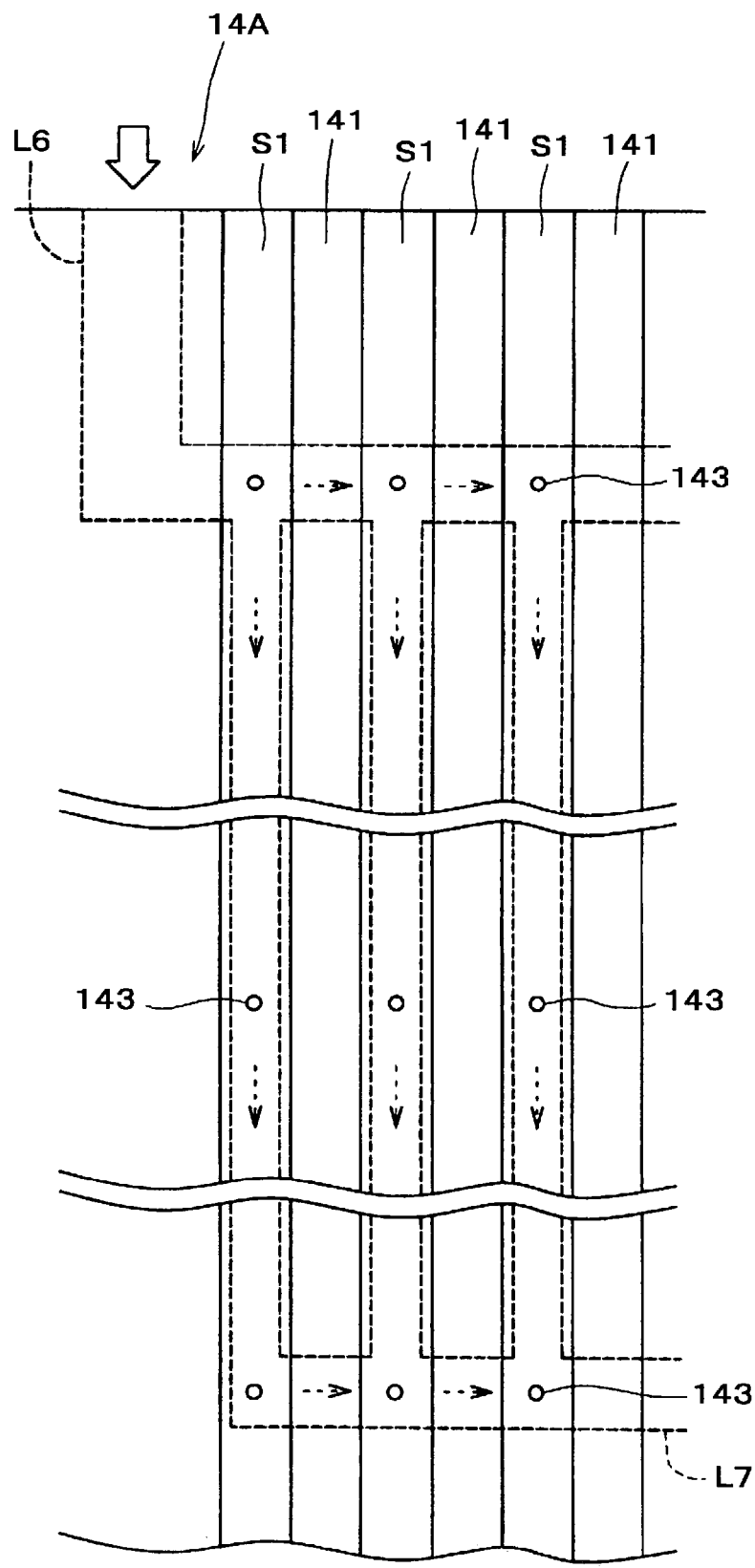
FIG. 17 is a partial enlarged view of the separator of the fuel cell of the third embodiment.
Figure 18:
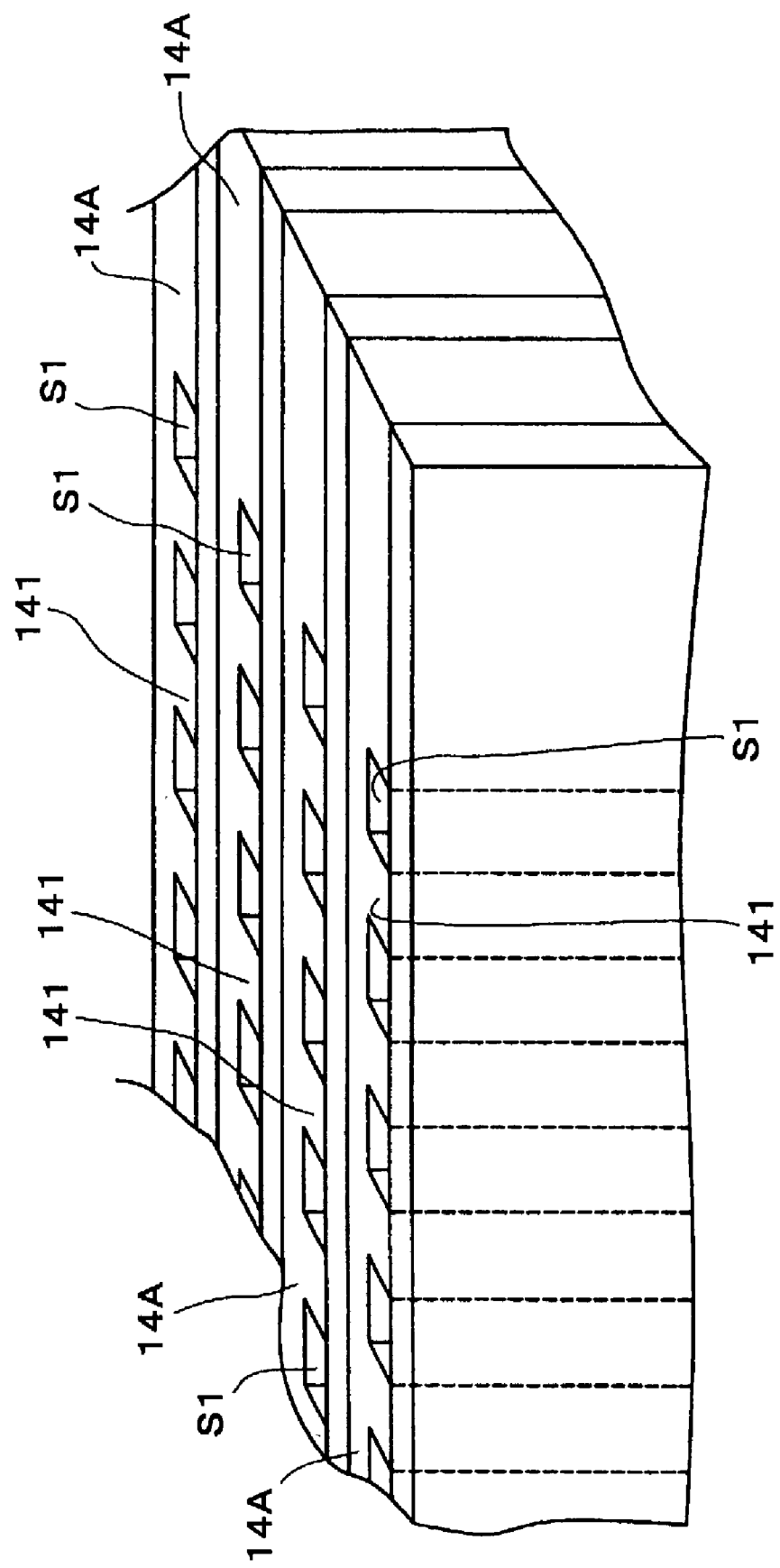
FIG. 18 is a partial enlarged perspective view of a fuel cell stack of the third embodiment.

As shown in FIG. 17, the thus-structured fuel cell consists of plural layers, serially connected, to form the fuel cell stack 1. The separator 14A may be structured so that the cooling water flows in a direction opposite the direction of the air flow.

Figure 19:
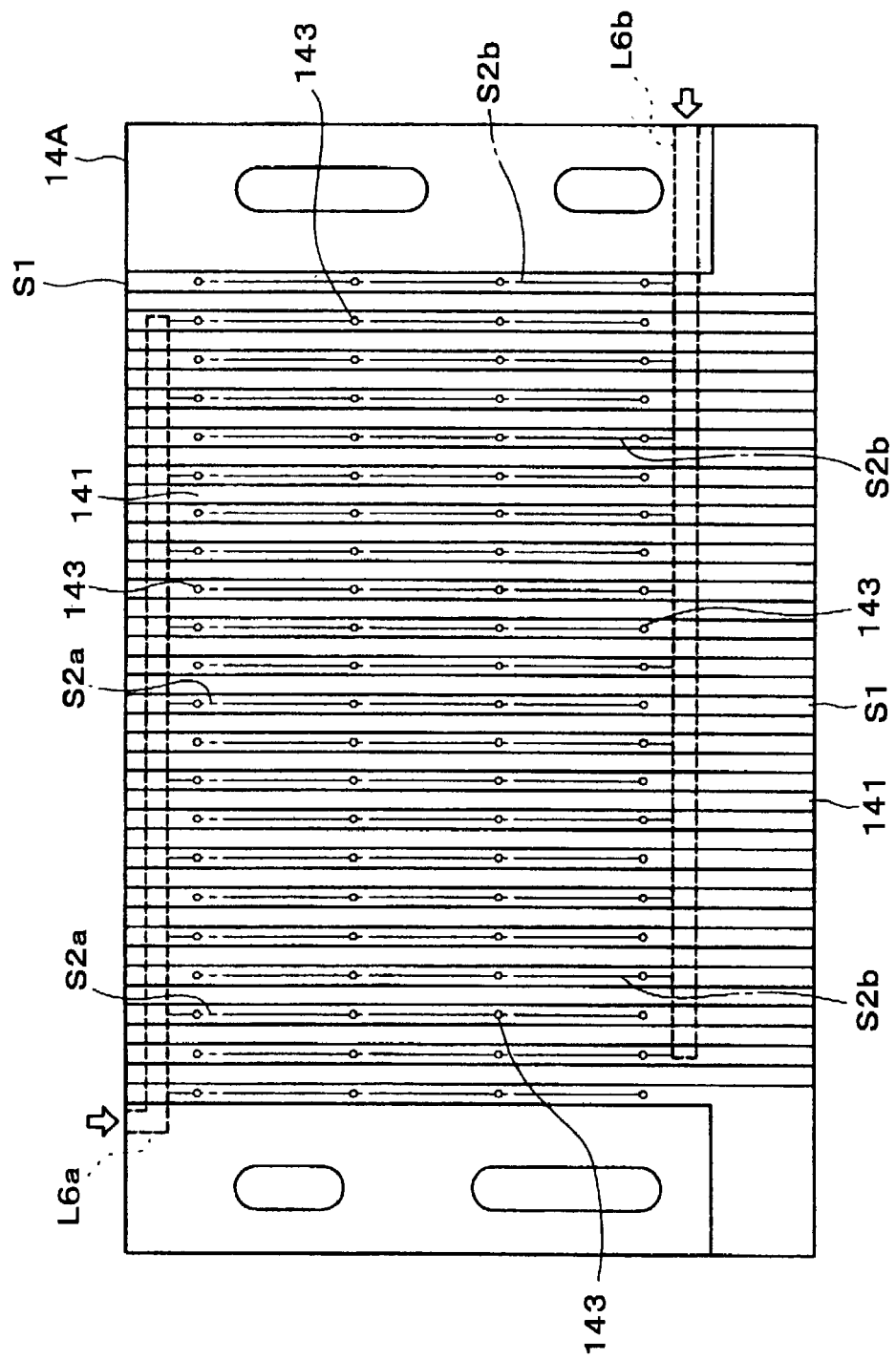
FIG. 19 is a front view of a fuel cell separator of a modification of the third embodiment.

The structure of the above-described fuel cell separator 14A may be modified as follows. As a first modification, the discharge passage L7 is omitted and the cooling water supplied in the cooling passages S2 all flows into the air supply passages S1 via the through-holes 143. In this case, for example, as shown in FIG. 19, supply passages L6a, L6b are respectively provided along the top and bottom edges of the separator 14A parallel with each other, and cooling passages S2a, S2b are alternately connected to the supply passages L6a, L6b, respectively. In this structure, the cooling water flows from top to bottom in the cooling passages S2a and the cooling water flows from bottom to top in the cooling passages S2b. That is, the cooling water passes in opposite directions, respectively. Since the cooling water flows through the passages while exchanging heat, the temperature of the cooling water increases toward the downstream side so that its cooling effect decreases. However, because in this embodiment, the cooling water flow is alternately reversed, the separator 14A is uniformly cooled.

In a second modification, the discharge passage L7 is omitted and the bottom end of all the cooling passages S2 discharge the cooling water from a bottom edge of the separator 14A. In such a structure, the discharged water may be collected in a catchment tray provided at the bottom side of the fuel cell stack 1 and then returned to a tank 40.

Figure 20:
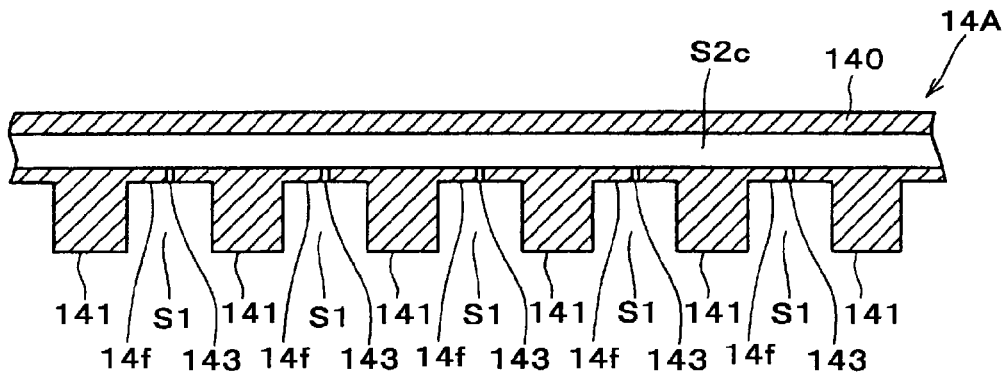
FIG. 20 is a partial horizontal sectional view of a fuel cell separator in another modification of the third embodiment.

In a third modification, as shown in FIG. 20, the cooling passages S2c may be formed in a direction crosswise to the air supply passages S1.

Figure 21:
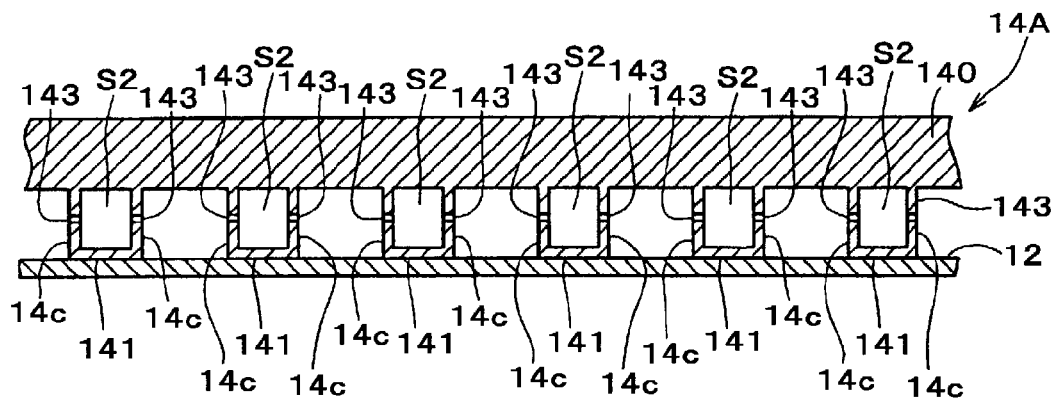
FIG. 21 is a partial horizontal sectional view of a fuel cell separator in still another modification of the third embodiment.

As a fourth modification, as shown in FIG. 21, the cooling passages S2 are formed in the partition wall 141. Since the partition wall 141 abuts the cathode 12, when the cooling passages S2 are formed in the partition wall 141, the cooling medium comes close to the cathode 12, which enhances the cooling effect. Additionally, in this case, the through-holes 143 communicating with the air supply passage S1 are formed on the sidewall surface 14c of the air supply passage S1. By providing the through-holes 143 on the sidewall surface 14c, the cooling water supplied to the air supply passages S1 can easily contact the cathode 12, which makes it possible to surely keep the electrode in a moist state.

Figure 22:
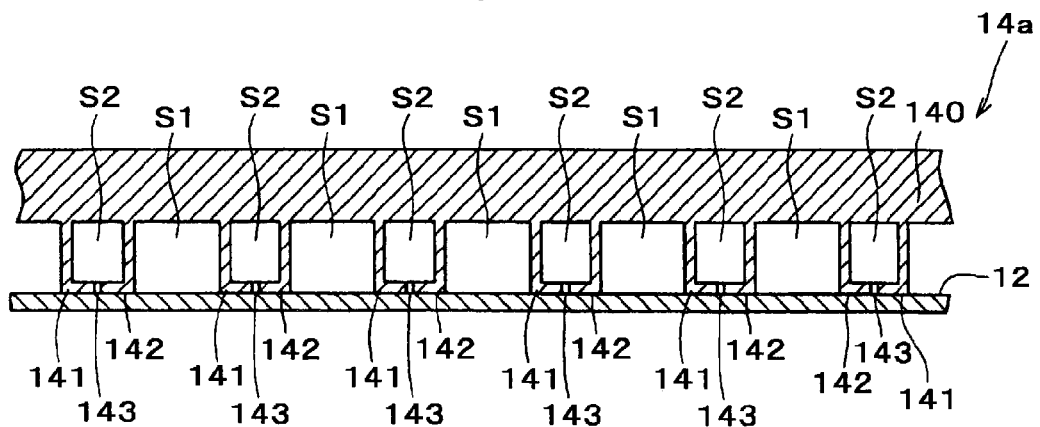
FIG. 22 is a partial horizontal sectional view of a fuel cell separator in yet another modification of the third embodiment.

In a fifth modification, as shown in FIG. 22, the cooling passages S2 may be formed in the partition wall 141 and the through-holes 143 may be formed in the top (abutting) surfaces 142 of the partition wall 141 in contact with the cathode 12. In this structure, the cooling water is directly supplied to the cathode 12 via the through-holes 143 so as to prevent drying of the cathode 12.

In a sixth modification, as shown in FIG. 23, the separator 14A comprises an air supply passage forming member 14Aa having a corrugated cross section and a planar rear portion 14Ab stacked on the back side thereof. A planar-shaped cooling passage S2 is formed as a space between the rear portion 14Ab and the member 14Aa to form a groove-shaped passage S2' in the partition wall 141. Such a structure increases the area receiving the cooling water so that the cooling effect is improved. The through-holes 143 can also be formed on both bottom surfaces 14f in the air supply passages S1 and sidewall surfaces 14c in the air supply passages S1.

Figure 24:
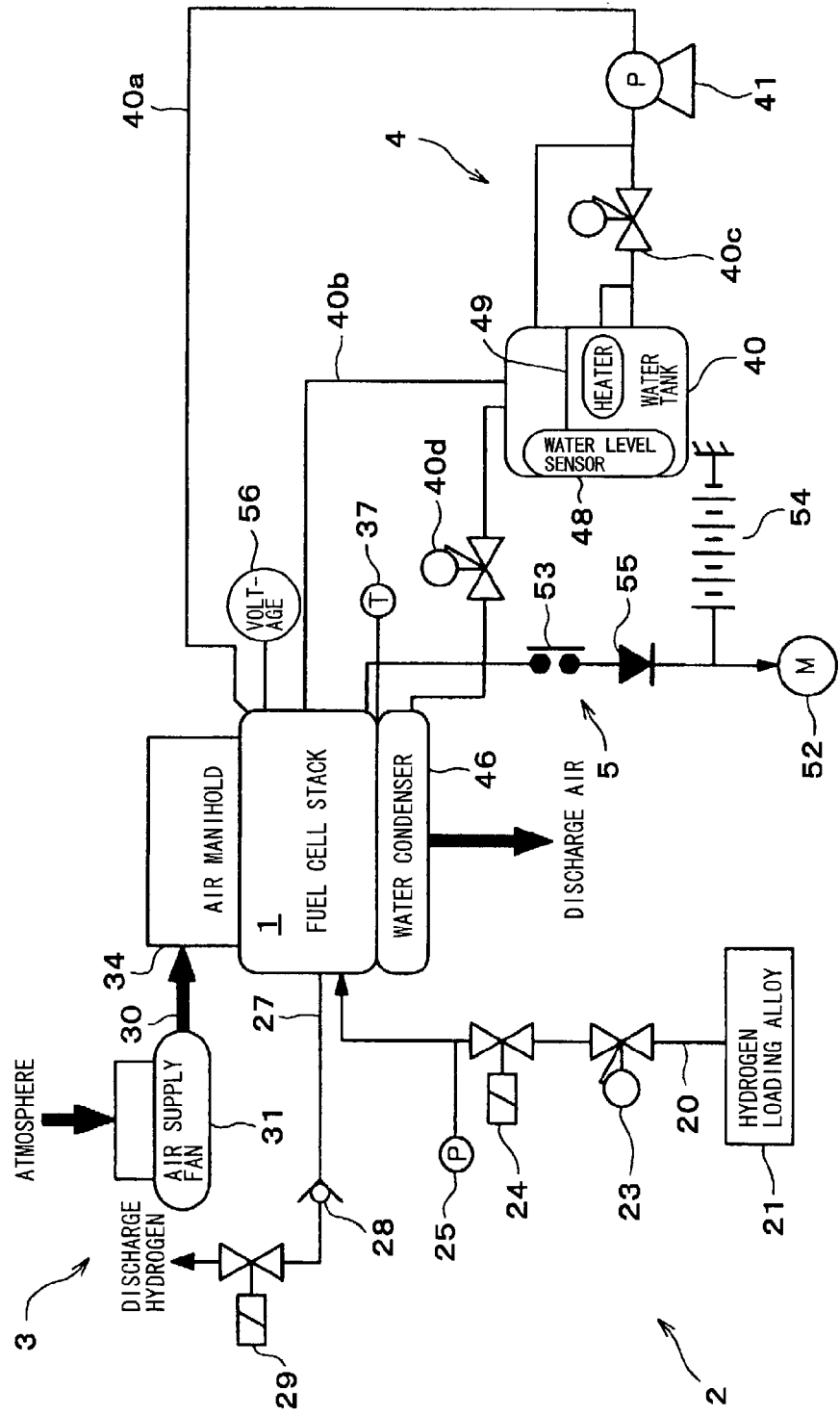
FIG. 24 is a block diagram of a fuel cell system of the third embodiment.

Next, a fuel cell system including the above-described fuel cell stack 1 will be described. As shown in FIG. 24, this fuel cell system is generally composed of the fuel cell stack 1, a fuel supply system 2 including a hydrogen loading alloy 21, an air supply system 3, a hydrogen supply system 4, and a load system 5.

In the fuel supply system 2, hydrogen emitted from the hydrogen loading alloy 21 through a hydrogen supply passage 20 is delivered to a hydrogen gas passage S3 of each unit of the fuel cell stack 1. In the hydrogen supply passage 20, a hydrogen regulator 23 is provided to regulate the pressure of the hydrogen gas emitted from the hydrogen loading alloy 21. A hydrogen supply electromagnetic valve 24 controls opening and shutting of the hydrogen supply passage 20. The hydrogen gas pressure just before supplied to the fuel cell stack 1 is monitored by a hydrogen pressure sensor 25.

In the fuel supply system 2, the hydrogen gas discharged from the fuel cell stack 1 is emitted to the atmosphere via a hydrogen discharge passage 27. The hydrogen discharge passage 27 is provided with a check valve 28 and an electromagnetic valve 29. The check valve 28 prevents air from entering the anode of the fuel cell stack 1 via the hydrogen discharge passage 27. The electromagnetic valve 29 is intermittently driven with the objective of complete combustion of the hydrogen.

The air supply system 3 supplies air from the atmosphere to the air passage S1 of the fuel cell stack 1 and discharges air exhausted from the fuel cell stack 1 through the water condenser 46. A fan 31 is provided in the air supply passage 30 to deliver air from the atmosphere to the air manifold 34.

The air flows into the air supply passage S1 of the fuel cell stack 1 from the manifold 34 to supply oxygen to the cathode 12. The moisture of the air discharged from the fuel cell stack 1 is condensed and collected in the water condenser 46, and the air is emitted to the atmosphere. The temperature of the air discharged from the fuel cell stack 1 is monitored by the exhaust temperature sensor 37.

The cooling water delivered from the cooling passage S2 to the air supply passage S1 reaches the water condenser 46 mainly in a liquid state, and is then delivered to the tank 40 to be collected. A part of the water supplied is evaporated, and then condensed and collected in the water condenser 46. It is considered that vapor included in exhaust air may include vapor from reaction water produced by the power generation reaction of the fuel cell stack 1.

The water supply system 4 supplies water from the tank 40, by use of the pump 41, to the cooling water supply passage L6 of each fuel cell unit via the pipe 40a, and a part of the supplied cooling water is collected from the discharge passage L7 of each fuel cell unit and returned to the tank 40 via the pipe 40b. In each fuel cell unit, the water supplied from the through-holes 143 to the air supply passages S1 is collected in the water condenser 46 and then returned to the tank 40. It is of course impossible to completely close the water supply system 4, so that water level of the tank 40 is monitored by the water level sensor 48 and, when the water level falls below a predetermined threshold value, water is resupplied from outside. In order to prevent the water in the tank 40 from freezing in winter, a heater 49 and a freeze preventing electromagnetic valve 40c are installed in the tank 40. An electromagnetic valve 40d is installed in a pipe connecting the water condenser 46 and the tank 40, so as to prevent the water in the tank 40 from evaporating. Output of the pump 41 is controlled depending on the temperature of the exhaust air detected by the exhaust temperature sensor 37 to adjust the amount of the cooling water circulating so as to maintain the fuel cell stack 1 at a desired temperature.

The load system 5 takes the output of the fuel cell stack 1 to the outside to drive a load of a motor 52 or the like. This load system 5 is provided with a relay 53 for switching and a secondary battery 54 as a subsidiary output source, and a diode 55 for rectification is provided between the secondary battery 54 and the relay 53. Note that the output of the fuel cell stack 1 itself is always monitored by a voltage sensor 56. Based on this detected output, a control circuit controls closing and opening of the hydrogen discharge electromagnetic valve 29.

According to the first embodiment of the present invention, since an air passage and a cooling space are separately provided on front and back sides, respectively, of a separator, there is no need for a special separator or a cooling plate in the separator, thus avoiding a thick separator. In addition, the separator is directly cooled by latent heat of evaporation in a cooling space, which can cool more efficiently and more uniformly than cooling with a cooling plate. In a conventional system where air and cooling water are simultaneously supplied, droplets of the cooling water adhere to the cathode surface, which causes water to clog the air passage. Therefore, the cross-sectional area of the air passage is broadened, especially the height of the groove constituting the air passage is increased, which is an obstacle to making a smaller and lighter fuel cell. However, in the present invention, water is supplied to the air passage in a vapor state, so that air supplied to an electrode is not disturbed by droplets even if the cross section area of the air passage is small. Thereby, such a structure enables a thin separator to achieve a small and light-weight fuel cell stack.

Arranging the air passage and the cooling space adjacent to each other provides a cooling effect. Since the air passage and the cooling space are not arranged in the layered direction in the separator, the separator is made thin, which achieves a light-weight fuel cell stack.

In embodiments wherein the separator is made of a pressed metal plate, manufacturing is facilitated, material cost is lowered and the separator can be made thinner. Further, making the separator thinner allows a decrease in heat capacity so that the effect of the latent heat cooling is more directly applied to the unit cell and cooling can be performed efficiently. Further, for the same reasons, it is also possible to shorten time for warming and to save energy for warming.

Where a hydrophilic process is applied to a wall surface surrounding the cooling space, a high temperature portion of the wall surface in the cooling space can more easily be wetted, which further enhances the effect of latent heat cooling. In addition, water does not easily clog up the passage and does not to disturb air supply.

Supply of air to the cooling space in a vapor saturated state allows the water vapor to enter the air passages via the through-holes, which inhibits removal of liquid water from the cathode in the air passage so as to fully maintain wetting of the electrode.

By connecting inlets of the cooling passages to a manifold, the cooling system can be simplified with regard to mixing water for cooling in the air supplied to the fuel cell, which achieves a small and light-weight fuel cell system as a whole.

Even with a metal separator with a low heat conductivity, supply of water to both of the air passages and the cooling passages enables a full cooling effect.

With cooling passages and air passages on opposite sides of the separator, the latent heat cooling occurs in both the cooling spaces and the air passages, heat generated by the unit cell can be fully removed and water is not removed from the cathode.

If the inlets of the air passages and the cooling passage are connected to a manifold, air and water are simultaneously supplied, so that the cooling system can be simplified and a small and light-weight fuel cell system can be achieved.

What is claimed is:

1. A fuel cell comprising:
a plurality of unit cells each including an anode and a cathode; and
a plurality of separators respectively positioned sandwiched between adjacent unit cells, each of said separators comprising:
a first planar array of parallel, linear air passages, each extending linearly between an inlet and an outlet;
a second planar array of parallel linear cooling passages each extending linearly between an inlet and an outlet, said first and second planar arrays being in parallel and separated by a partition wall;
a plurality of linear arrays of through-holes respectively associated with said cooling passages and extending through said partition wall, each linear array of through-holes providing fluid communication between its associated cooling passage and an adjacent air passage, each of said linear arrays of through-holes extending along the length of the associated cooling passage, from a through-hole adjacent an inlet of the associated cooling passage to a through-hole adjacent an outlet of the associated cooling passage; and
coolant supply means for supplying a mixture of air and dispersed water to said cooling passages, wherein the dispersed water evaporates to cool the unit cell by removal of heat as latent heat and to form vapor which passes through linear arrays of through-holes from the cooling passages into respective adjacent air passages.

2. The fuel cell of claim 1 wherein said partition wall is a current collector.

3. The fuel cell of claim 1 wherein said air passages have respective longitudinal openings closed by a cathode of a unit cell.

4. The fuel cell of claim 1 wherein the though-holes of each linear array of through-holes are evenly spaced.

5. The fuel cell of claim 1 wherein said cooling passages and said air passages are defined by longitudinal wall surfaces formed as corrugations in a metal plate serving as a current collector.

6. The fuel cell of claim 1 wherein said separator includes a corrugated metal plate wherein spaces between raised portions on one surface serve as the air passages and spaces between raised portions on a second surface, opposite said first surface, serve as the cooling passages.

7. The fuel cell of claim 1 wherein the air passages extend in parallel with the cooling passages.

8. The fuel cell of claim 1 wherein at least a portion of a wall surface of a cooling passage has a hydrophilic coating.

9. The fuel cell of claim 1 wherein at least a portion of a wall surface of a cooling passage has been made hydrophilic by roughening.

10. The feul cell of claim 1 wherein the inlets of the air passages are closed and air enters the air passages, with water vapor, through the through-holes.

11. The fuel cell of claim 1 wherein the separator further comprises a manifold for receiving air and water and for distributing a mixture of the air and water to the inlets of the cooling passages.

12. The fuel cell of claim 1 wherein the separator is metal.

13. A fuel cell of claim 12 wherein the separator includes at least two abutting corrugated plates, wherein spaces between raised portions on one plate are arranged facing spaces between raised portions on another plate to form the cooling passages.

* * * * *